(12) United States Patent
Herr et al.

(10) Patent No.: US 10,908,884 B2
(45) Date of Patent: Feb. 2, 2021

(54) METHODS AND APPARATUS FOR RUNTIME MULTI-SCHEDULING OF SOFTWARE EXECUTING ON A HETEROGENEOUS SYSTEM

(71) Applicant: Intel Corporation, Santa Clara, CA (US)

(72) Inventors: Adam Herr, Forest Grove, OR (US); Derek Gerstmann, Del Mar, CA (US); Justin Gottschlich, Santa Clara, CA (US); Mikael Bourges-Sevenier, Santa Clara, CA (US); Sridhar Sharma, Palo Alto, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/455,379

(22) Filed: Jun. 27, 2019

(65) Prior Publication Data

US 2019/0317740 A1    Oct. 17, 2019

(51) Int. Cl.
| | | |
|---|---|---|
| *G06F 9/44* | (2018.01) | |
| *G06F 8/41* | (2018.01) | |
| *G06N 3/08* | (2006.01) | |
| *G06F 8/54* | (2018.01) | |
| *G06F 9/48* | (2006.01) | |

(52) U.S. Cl.
CPC ............... *G06F 8/41* (2013.01); *G06F 8/54* (2013.01); *G06N 3/08* (2013.01); *G06F 9/4843* (2013.01)

(58) Field of Classification Search
None
See application file for complete search history.

(56) References Cited

U.S. PATENT DOCUMENTS 9,483,282 B1    11/2016  Vandervennet et al.
9,800,466 B1    10/2017  Rangole
(Continued)

OTHER PUBLICATIONS

"SYCL: C++ Single-source Heterogeneous Programming for OpenCL," Khronos, [Online]. last retrieved Jul. 10, 2019, Available: https://www.khronos.org/sycl/, 7 pages.
(Continued)

*Primary Examiner* — Qamrun Nahar
(74) *Attorney, Agent, or Firm* — Hanley, Flight & Zimmerman, LLC

(57) ABSTRACT

Methods, apparatus, systems and articles of manufacture are disclosed for runtime scheduling of software executing on a heterogeneous system. An example apparatus includes in response to a variant compiler to generate a representation of an algorithm in a domain-specific language (DSL), a compilation auto-scheduler to generate a schedule based on configurations for processing elements of the heterogeneous system, the processing elements including at least a first and a second processing element, the variant compiler to compile variant binaries based on the schedule, each of the variant binaries associated with the algorithm in the DSL, the variant binaries including a first variant binary corresponding to the first processing element and a second variant binary corresponding to the second processing element, and an application compiler to generate a fat binary including a runtime scheduler to select one or more of the variant binaries to execute a workload based on the schedule.

28 Claims, 13 Drawing Sheets

(56) References Cited

U.S. PATENT DOCUMENTS

| | | | |
|---|---|---|---|
| 10,007,520 | B1 | 6/2018 | Ross |
| 10,445,118 | B2 | 10/2019 | Guo et al. |
| 2009/0158248 | A1 | 6/2009 | Linderman et al. |
| 2010/0153934 | A1* | 6/2010 | Lachner .................. G06F 8/45 717/146 |
| 2013/0212365 | A1 | 8/2013 | Chen et al. |
| 2016/0350088 | A1* | 12/2016 | Ravishankar ......... G06F 8/4434 |
| 2018/0082212 | A1 | 3/2018 | Faivishevsky et al. |
| 2018/0173675 | A1 | 6/2018 | Tamir et al. |
| 2018/0183660 | A1 | 6/2018 | Byers et al. |

OTHER PUBLICATIONS

Chen et al., "Learning to Optimize Tensor Programs," 32nd Conference on Neural Information Processing Systems (NeurIPS 2018), Montreal, Canada, 12 pages.

Chen et al., "TVM: An Automated End-to-End Optimizing Compiler for Deep Learning," in SysML 2018, Palo Alto, 2018, 17 pages.

Ragan-Kelley, "Decoupling Algorithms from the Organization of Computation for High Performance Image Processing: The design and implementation of the Halide language and compiler," MIT, Cambridge, MA, Jun. 2014, 187 pages.

Ragan-Kelley, "Decoupling Algorithms from the Organization of Computation for High Performance Image Processing: The design and implementation of the Halide language and compiler," MIT PhD Thesis, Jun. 2014, 195 pages.

Ragan-Kelley, "Halide," [Online]. last retrieved Jul. 10, 2019, Available: http://halide-lang.org/, 3 pages.

Ragan-Kelley et al., "Halide: a language and compiler for optimizing parallelism, locality, and recomputation in image processing pipelines," PLDI Seattle, Jun. 16-21, 2013, 12 pages.

Adams et al., "Learning to Optimize Halide with Tree Search and Random Programs," ACM Trans. Graph., vol. 38, No. 4, pp. 121:1-121:12, Jul. 2019, 12 pages.

Ahmad, M. and Cheung, A., "Metalift," [Online]. Last retrieved Jul. 10, 2019, Available: http://metalift.uwplse.org/., 4 pages.

Nickolls et al., "Scalable Parallel Programming with CUDA," ACM Queue—GPU Computing, vol. 6, No. 2, pp. pp. 40-53 , 2008.I.

Buck, M. Garland and K. Skadron, "Scalable Parallel Programming with CUDA," ACM Queue—GPU Computing, vol. 6, No. 2, pp. 40-53, Apr. 28, 2008, 19 pages.

Dagum et al., "OpenMP: An Industry-Standard API for Shared-Memory Programming," IEEE Computational Science & Engineering, vol. 5, No. 1, pp. 46-55, Jan.-Mar. 1998, 10 pages.

Ansel et al., "OpenTuner: An Extensible Framework for Program Autotuning," Computer Science and Artificial Intelligence Laboratory Technical Report, MIT, Cambridge, Nov. 1, 2013, 15 pages.

Ahmad et al., "Automatically Translating Image processing Libraries to Halide," ACM Trans. Graph., vol. 38, No. 6, pp. 204:2-204:13, Last retrieved Oct. 2, 2019.

Mullapudi et al., "Automatically Scheduling Halide Image Processing Pipelines," SIGGRAPH, Anaheim, Jul. 24-28, 2016, 11 pages.

Munshi et al., "OPENCL Programming Guide," Addison-Wesley Professional, Upper Saddle River, 2012, 120 pages.

Van De Geijn et al., "SUMMA: Scalable Universal Matrix Multiplication Algorithm," University of Texas at Austin, Austin, 1995, 19 pages.

The Khronos Group, "OpenCL Specification," Nov. 14, 2012, version 1.2, 380 pages.

The Khronos Group, "Vulkan 1.1 API Specification." Khronos, Mar. 2018, [Online]. last retrieved Sep. 25, 2019, Available: https://www.khronos.org/registry/vulkan/, 15 pages.

Kamil et al., "Verified Lifting of Stencil Computations," PLDI, Santa Barbara, pp. 711-726, Jun. 13-17, 2016, 16 pages.

United States Patent and Trademark Office, "Non-Final Office Action" issued in connection with U.S. Appl. No. 16/455,486, dated Jun. 25, 2020, 16 pages.

Greskamp et al., "A Virtual Machine for Merit-Based Runtime Reconfiguration," Proceedings of the 13th Annual IEEE Symposium on Field-Programmable Custom Computing Machines, 2005, 2 pages.

Altera, "FPGA Run-Time Reconfiguration: Two Approaches," Mar. 2008, ver. 1.0, 6 pages.

Intel, "Intel® FPGA SDK for OpenCL Best Practices Guide," May 8, 2017, 135 pages.

Bergeron et al., "Hardware JIT compilation for off-the-shelf dynamically reconfigurable FPGAs," DIRO, Universite de Montreal GRM, Ecole Polytechnique de Montreal, Budapest, Hungary, Mar. 29-Apr. 6, 2008 ,16 pages.

Altera, "Machines Ensuring the Right Path," retrieved on Sep. 22, 2017, 4 pages.

Greaves, "Distributing C# Methods and Threads over Ethernet-connected FPGAs using Kiwi," 2011, retrieved on Sep. 22, 2017, 13 pages.

IBM Research, "Liquid Metal," retrieved on Sep. 22, 2017, http://researcher.watson.ibm.com/researcher/view_group.php?id=122, 4 pages.

Cray X1TM System, "Optimizing Processor-bound Code," http://docs.cray.com/books/S-2315-52/html-S-2315-52/z1073673157.html, 12 pages, retrieved on Sep. 22, 2017.

Raman et al., "Parcae: A System for Flexible Parallel Execution," Jun. 2012, 20 pages.

Huang et al., "Programming and Runtime Support to Blaze FPGA Accelerator Deployment at Datacenter Scale," Oct. 2016, 21 pages.

United States Patent and Trademark Office, "Non-Final Office Action" issued in connection with U.S. Appl. No. 15/713,301, dated Jul. 20, 2018, 10 pages.

United States Patent and Trademark Office, "Final Office Action" issued in connection with U.S. Appl. No. 15/713,301, dated Jan. 28, 2019, 12 pages.

United States Patent and Trademark Office, "Notice of Allowance" issued in connection with U.S. Appl. No. 15/713,301, dated May 23, 2019, 7 pages.

Hoffmann et al., "Dynamic Knobs for Responsive Power-Aware Computing," Mar. 2011, 14 pages.

United States Patent and Trademark Office, "Non-Final Office Action" issued in connection with U.S. Appl. No. 16/455,628, on Aug. 7, 2020, 18 pages.

European Patent Office, "Extended European Search Report", issued in connection with EP patent application No. 20165699.8, dated Nov. 19, 2020 (13 pages).

P. Balaprakash et al., "Autotuning in High-Performance Computing Applications," in Proceedings of the IEEE, vol. 106, No. 11, pp. 2068-2083, Nov. 2018, doi: 10.1109/JPROC.2018.2841200 (16 pages).

S. Barati et al., "Proteus: Language and Runtime Support for Self-Adaptive Software Development," in IEEE Software, vol. 36, No. 2, pp. 73-82, Mar.-Apr. 2019, doi: 10.1109/MS.2018.2884864.

Alam et al., "A Zero-Positive Learning Approach for Diagnosing Software Performance Regressions," May 31, 2019 (12 pages).

* cited by examiner

US 10,908,884 B2

METHODS AND APPARATUS FOR RUNTIME MULTI-SCHEDULING OF SOFTWARE EXECUTING ON A HETEROGENEOUS SYSTEM

FIELD OF THE DISCLOSURE

This disclosure relates generally to machine learning and, more particularly, to methods and apparatus for runtime multi-scheduling of software executing on a heterogeneous system.

BACKGROUND

Computer hardware manufacturers develop hardware components for use in various components of a computer platform. For example, computer hardware manufacturers develop motherboards, chipsets for motherboards, central processing units (CPUs), graphics processing units (GPUs), vision processing units (VPUs), field programmable gate arrays (FPGAs), hard-disk drives (HDDs), solid-state drives (SSDs), and other computer components. Many computer hardware manufacturers develop programs and/or other methods to compile algorithms and/or other code to be run on a specific processing platform.

Figure 1:
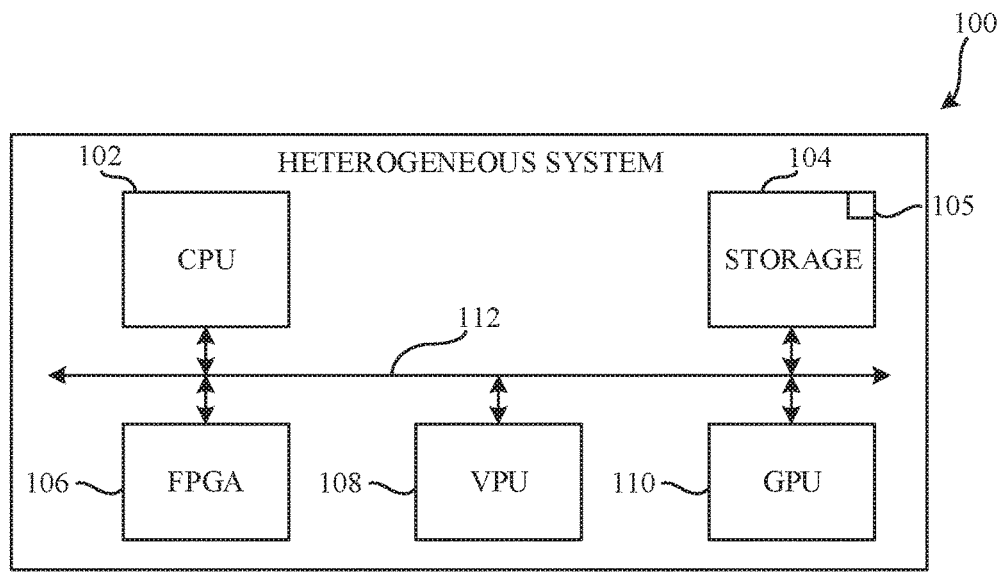
FIG. 1 depicts a block diagram illustrating an example heterogeneous system.

The figures are not to scale. In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Many computer hardware manufacturers and/or other providers develop programs and/or other methods to compile algorithms and/or other code to be run on a specific processing platform. For example, some computer hardware manufacturers develop programs and/or other methods to compile algorithms and/or other code to be run on a CPU, an FPGA, a GPU, or a VPU. Such programs and/or other methods function using domain-specific languages (DSLs). DSLs (e.g., Halide, OpenCL, etc.) utilize the principle of separation of concerns to separate how an algorithm (e.g., a program, a block of code, etc.) is written from how the algorithm is executed. For example, many DSLs prompt a developer of an algorithm to implement a high-level strategy to map a processing pipeline for the algorithm to a parallel machine (e.g., a schedule).

For example, an algorithm may be defined to blur an image (e.g., how the algorithm is written) and a developer may desire for the algorithm to run effectively on a CPU, an FPGA, a GPU, and a VPU. To effectively run the algorithm on the various types of processing elements (e.g., a CPU, an FPGA, a GPU, a VPU, a heterogeneous system, etc.), a schedule is to be generated. To generate the schedule, the algorithm is transformed in different ways depending on the particular processing element. Many methods of automating compilation time scheduling of an algorithm have been developed. For example, compilation auto-scheduling may include auto-tuning, heuristic searching, and hybrid scheduling.

Auto-tuning includes compiling an algorithm in a random way, executing the algorithm, measuring the performance of the processing element, and repeating the process until a threshold of performance has been met (e.g., power consumption, speed of execution, etc.). However, in order to achieve a desired threshold of performance, an extensive compilation time is required, and the compilation time is compounded as the complexity of the algorithm increases.

Heuristic searching includes (1) applying rules that define types of algorithm transformations that will improve the performance to meet a performance threshold and (2) applying rules that define types of algorithm transformations that will not improve the performance to meet the performance threshold. Then, based on the rules, a search space can be defined and searched based on a cost model. The cost model, however, is generally specific to a particular processing element. Similarly, the cost model is difficult to define for an arbitrary algorithm. For example, cost models work for predetermined conditions, but for unknown conditions cost models generally fail.

Hybrid scheduling includes utilizing artificial intelligence (AI) to identify a cost model for a generic processing element. The cost model can correspond to representing, predicting, and/or otherwise determining computation costs of one or more processing elements to execute a portion of code to facilitate processing of one or more workloads. For example, artificial intelligence including machine learning (ML), deep learning (DL), and/or other artificial machine-driven logic enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. Some types of machine learning models include, for example, a support vector machine (SVM), a neural network (NN), a recurrent neural network (RNN), a convolutional neural network (CNN), a long short term memory (LSTM), a gate recurrent unit (GRU), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Training is performed using training data. Once training is complete, the model is deployed for use as an executable construct that processes an input and provides an output based on the network of nodes and connections defined in the model.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Regardless of the ML/AI model that is used, once the ML/AI model is trained, the ML/AI model generates a cost model for a generic processing element. The cost model is then utilized by an auto-tuner to generate a schedule for an algorithm. Once a schedule is generated, the schedule is utilized by an integrated development environment (IDE) associated with a DSL to generate an executable file.

The executable file includes a number of different executable sections, where each executable section is executable by a specific processing element, and the executable file is referred to as a fat binary. For example, if a developer is developing code to be used on a heterogeneous processing platform including a CPU, an FPGA, a GPU, and a VPU, an associated fat binary will include executable sections for the CPU, the FPGA, the GPU, and the VPU, respectively. In such examples, a runtime scheduler can utilize the fat binary to execute the algorithm on at least one of the CPU, the FPGA, the GPU, or the VPU depending on the physical characteristics of the heterogeneous system and a function that defines success for the execution (e.g., a function designating successful execution of the algorithm on the heterogeneous system). For example, such a success function may correspond to executing the function to meet and/or otherwise satisfy a threshold of power consumption. In other examples, a success function may correspond to executing the function in a threshold amount of time. However, a runtime scheduler may utilize any suitable success function when determining how to execute the algorithm, via the fat binary, on a heterogeneous system.

While auto-tuning, heuristic searching, and AI-based hybrid methods may be acceptable methods of scheduling during compilation time, such methods of scheduling do not account for the load and real-time performance of the individual processing elements of heterogeneous systems. For example, when developing cost models, a developer or AI system makes assumptions about how a particular processing element (e.g., a CPU, an FPGA, a GPU, a VPU, etc.)

is structured. Moreover, a developer or AI system may make assumptions regarding the particular computational elements, memory subsystems, interconnections fabrics, and/or other components of a particular processing element. However, these components of the particular processing element are volatile, sensitive to load and environmental conditions, include nuanced hardware design details, have problematic drivers/compilers, and/or include performance behavior that is counterintuitive to expected performance.

For example, when a heterogeneous system offloads one or more computation tasks (e.g., a workload, a computation workload, etc.) to a GPU, there are particular ramifications for not offloading enough computation to the GPU. More specifically, if an insufficient quantity of computation tasks is offloaded to a GPU, one or more hardware threads of the GPU can stall and cause one or more execution units of the GPU to shut down and, thus, limit processing power of the GPU. An example effect of such a ramification can be that a workload of size X offloaded to the GPU may have the same or substantially similar processing time as a workload of size 0.5× offloaded to the GPU.

Furthermore, even the movement of data from one processing element to another processing element can cause complications. For example, a runtime scheduler may utilize a GPU's texture sampler to process images in a workload. To offload the workload to the GPU, the images are converted from a linear format supported by the CPU to a tiled format supported by the GPU. Such a conversion incurs computational cost on the CPU and while it may be faster to process the image on the GPU, the overall operation of converting the format of the image on the CPU and subsequent processing on the GPU may be longer than simply processing the image on the CPU.

Additionally, many compilers utilize an auto-vectoring which relies on a human developer's knowledge of transformations and other scheduling techniques to trigger the auto-vectorizing functionality. Thus, a developer who is unaware of these techniques will have a less than satisfactory executable file.

Examples disclosed herein include methods and apparatus for runtime multi-scheduling of software executing on a heterogeneous system. As opposed to some methods for compilation scheduling, the examples disclosed herein do not rely solely on theoretical understanding of processing elements, developer knowledge of algorithm transformations and other scheduling techniques, and the other pitfalls of some methods for compilation scheduling.

Examples disclosed herein include an example variant generator to generate a representation of an algorithm in a DSL. The example variant generator can obtain configuration(s) (e.g., target configuration(s)) for processing element(s) of interest and configure an auto-scheduler (e.g., a compilation auto-scheduler) based on the configuration(s). For example, a target configuration can correspond to a processing element application programming interface (API), a host architecture, code-generation options, scheduling heuristics, etc., and/or a combination thereof for a processing element of interest.

In some disclosed examples, the variant generator compiles a variant binary file for respective processing elements and add the variant binary file(s) to a variant library. In some disclosed examples, the variant generator constructs a jump table library by adding jump table entries to a jump table, where the jump table entries can include variant symbols that correspond to the variant binary files. The example variant generator can generate an executable that includes a fat binary to execute an application and/or a plurality of workloads by linking a runtime scheduler with at least one of (1) the jump table library including the jump table or (2) a variant library including the one or more variant binary files. During runtime, an example heterogeneous system can execute the application and/or the plurality of the workloads by invoking the fat binary to dynamically select one(s) of the one or more variant binary files based on performance characteristics of the heterogeneous system to improve runtime performance of software executing on the heterogeneous system.

FIG. 1 depicts a block diagram illustrating an example heterogeneous system 100. In the illustrated example of FIG. 1, the heterogeneous system 100 includes an example CPU 102, example storage 104, an example FPGA 106, an example VPU 108, and an example GPU 110. The storage 104 of FIG. 1 includes an example executable 105. Alternatively, the storage 104 may include more than one executable. In the illustrated example of FIG. 1, the heterogeneous system 100 is a system on a chip (SoC). Alternatively, the heterogeneous system 100 may be any other type of computing or hardware system.

In the illustrated example of FIG. 1, each of the CPU 102, the storage 104, the FPGA 106, the VPU 108, and the GPU 110 is in communication with the other elements of the heterogeneous system 100. For example, the CPU 102, the storage 104, the FPGA 106, the VPU 108, and the GPU 110 are in communication via an example communication bus 112. For example, the communication bus 112 may correspond to an interface circuit or any other type of hardware or logic circuit to facilitate inter-element communication. In some examples, one or more of the CPU 102, the storage 104, the FPGA 106, the VPU 108, and/or the GPU 110 are in communication via any suitable wired and/or wireless communication method. In some examples, one or more of the CPU 102, the storage 104, the FPGA 106, the VPU 108, and/or the GPU 110 can be in communication with any processing element or hardware component exterior to the heterogeneous system 100 via any suitable wired and/or wireless communication method.

In the illustrated example of FIG. 1, the CPU 102 is a processing element that executes instructions (e.g., machine-readable instructions that are included in and/or otherwise correspond to the executable 105) to execute, perform and/or facilitate a completion of operations associated with a computer or computing device. In FIG. 1, the CPU 102 is a primary processing element for the heterogeneous system 100 and includes at least one core. Alternatively, the CPU 102 may be a co-primary processing element (e.g., in an example where more than one CPU is utilized) while, in other examples, the CPU 102 may be a secondary processing element.

In the example illustrated in FIG. 1, the storage 104 is memory including the executable 105. Additionally or alternatively, the executable 105 may be stored in the CPU 102, the FPGA 106, the VPU 108, and/or the GPU 110. In FIG. 1, the storage 104 is a shared storage between at least one of the CPU 102, the FPGA 106, the VPU 108, or the GPU 110. In FIG. 1, the storage 104 is a physical storage local to the heterogeneous system 100. Alternatively, the storage 104 may be external to and/or otherwise be remote with respect to the heterogeneous system 100. Alternatively, the storage 104 may be a virtual storage. In the example of FIG. 1, the storage 104 is a persistent storage (e.g., read only memory (ROM), programmable ROM (PROM), erasable PROM (EPROM), electrically erasable PROM (EEPROM), etc.). Alternatively, the storage 104 may be a persistent basic input/output system (BIOS) or a flash storage. Alternatively, the storage 104 may be a volatile memory.

In the illustrated example of FIG. 1, one or more of the FPGA 106, the VPU 108, and/or the GPU 110 are processing elements that may be utilized by a program executing on the heterogeneous system 100 for computing tasks, such as hardware acceleration. For example, the FPGA 106 is a versatile programmable processing element that can be used for a computable operation or process. In other examples, the VPU 108 is a processing element that includes processing resources that are designed and/or otherwise configured or structured to improve the processing speed and overall performance of processing machine vision tasks for AI. In yet other examples, the GPU 110 is a processing element that is designed and/or otherwise configured or structured to improve the processing speed and overall performance of computer graphics and/or image processing. While the FPGA 106, the VPU 108, and GPU 110 include functionality to support specific processing tasks, one or more of the FPGA 106, the VPU 108, and/or the GPU 110 can correspond to processing elements that support general processing tasks that may be offloaded from the CPU 102 on an as-needed basis.

While the heterogeneous system 100 of FIG. 1 includes the CPU 102, the storage 104, the FPGA 106, the VPU 108, and the GPU 110, in some examples, the heterogeneous system 100 may include any number and/or type of processing elements including application-specific instruction set processors (ASIPs), physic processing units (PPUs), digital signal processors (DSPs), image processors, coprocessors, floating-point units, network processors, multi-core processors, and front-end processors.

Figure 2:
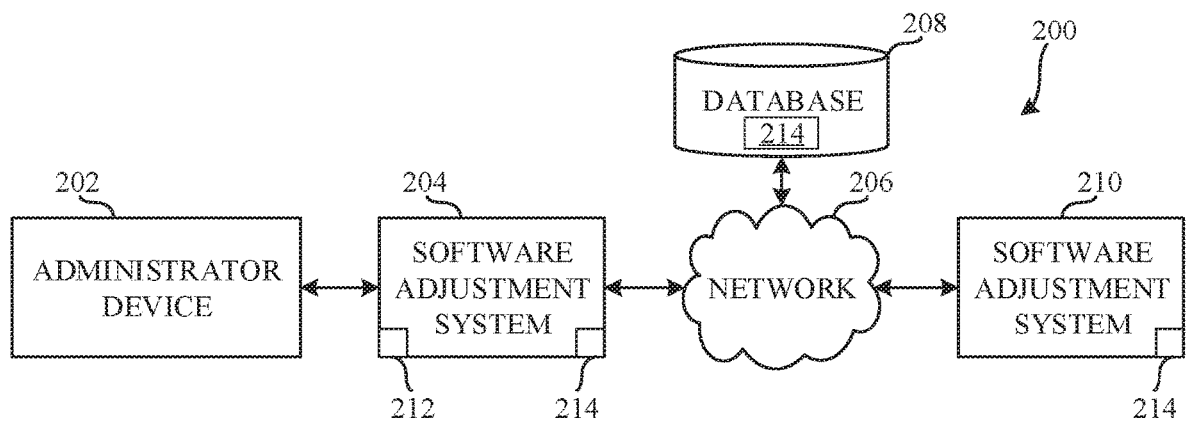
FIG. 2 depicts a block diagram illustrating an example software adjustment system including a first software adjustment system and a second software adjustment system to train an example machine learning/artificial intelligence model.

FIG. 2 depicts a block diagram illustrating an example system (e.g., a software adjustment system) 200 including an example administrator device 202, a first example software adjustment system 204, an example network 206, an example database 208, and a second example software adjustment system 210.

In the illustrated example of FIG. 2, the administrator device 202 is a desktop computer. Alternatively, the administrator device 202 may be any suitable computing system or platform such as a mobile phone, a tablet computer, a workstation, a laptop computer, or a server. In operation, an administrator or user may train the first software adjustment system 204 via the administrator device 202. For example, an administrator may generate training data via the administrator device 202. In some examples, the training data originates from randomly generated algorithms that are subsequently utilized by the first software adjustment system 204. For example, an administrator may use the administrator device 202 to generate and transmit a large quantity (e.g., hundreds, thousands, hundreds of thousands, etc.) of algorithms to the first software adjustment system 204 to train the first software adjustment system 204. In FIG. 2, the administrator device 202 is in communication with the first software adjustment system 204 via a wired connection. Alternatively, the administrator device 202 may be in communication with the first software adjustment system 204 via any suitable wired and/or wireless connection.

In the illustrated example of FIG. 2, one or both the first software adjustment system 204 and/or the second software adjustment system 210 generate and improve the execution of applications on heterogeneous systems (e.g., the heterogeneous system 100 of FIG. 1). One or both the first software adjustment system 204 and/or the second software adjustment system 210 utilize ML/AI techniques to generate applications based on received algorithms and performance of a processing element.

In the illustrated example of FIG. 2, the first software adjustment system 204 is in communication with the administrator device 202 via a wired connection. Alternatively, the first software adjustment system 204 may be in communication with the administrator device 202 via any suitable wired and/or wireless connection. Additionally, the first software adjustment system 204 is in communication with the database 208 and the second software adjustment system 210 via the network 206. The first software adjustment system 204 may be in communication with the network 206 via any suitable wired and/or wireless connection.

In the illustrated example of FIG. 2, the system 200 includes the first software adjustment system 204 to train an ML/AI model (e.g., an untrained ML/AI model) 212 to generate a trained ML/AI model 214 that can be utilized to develop code and/or other algorithms for execution on the heterogeneous system 100 of FIG. 1. In response to the training, the first software adjustment system 204 can transmit and/or store the trained ML/AI model 214. For example, the first software adjustment system 204 can transmit the trained ML/AI model 214 to the database 208 via the network 206. Additionally or alternatively, the first software adjustment system 204 may transmit the trained ML/AI model 214 to the second software adjustment system 210.

In the illustrated example of FIG. 2, the system 200 includes the second software adjustment system 210 to utilize the trained ML/AI model 214 to execute code and/or other algorithms on a heterogeneous system. The second software adjustment system 210 may obtain the trained ML/AI model 214 from the first software adjustment system 204 or the database 208. Alternatively, the second software adjustment system 210 may generate the trained ML/AI model 214.

In some examples, the second software adjustment system 210 collects and/or otherwise obtains data associated with at least one of a heterogeneous system or a system-wide success function of the heterogeneous system. In response to collecting the data, the second software adjustment system 210 can transmit the data to the first software adjustment system 204 and/or the database 208. The second software adjustment system 210 may format the data in a variety of ways as described below in connection with FIG. 3.

In the illustrated example of FIG. 2, the network 206 is the Internet. However, the network 206 may be implemented using any suitable wired and/or wireless network(s) including, for example, one or more data buses, one or more Local Area Networks (LANs), one or more wireless LANs (WLANs), one or more cellular networks, one or more private networks, one or more public networks, etc. The network 206 enables the first software adjustment system 204, the database 208, and/or the second software adjustment system 210 to be in communication with each other.

In the illustrated example of FIG. 2, the system 200 includes the database 208 to record and/or otherwise store data (e.g., heterogeneous system performance data, a system-wide success function, the trained ML/AI model 214, etc.). The database 208 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 208 may additionally or alternatively be implemented by one or more double data rate (DDR) memories, such as DDR, DDR2, DDR3, DDR4, mobile DDR (mDDR), etc. The database 208 may additionally or alternatively be implemented by one or more mass storage devices such as hard-disk drive(s) (HDD(s)), compact disk (CD) drive(s), digital versatile disk (DVD) drive(s), solid-state disk (SSD) drive(s), etc. While in the illustrated example the database 208 is illustrated as a single database, the database 208 may be implemented by any number and/or type(s) of databases. Furthermore, the data stored in the database 208 may be in any data format such as, for example, binary data, comma delimited data, tab delimited data, structured query language (SQL) structures, etc. In FIG. 2, the database 208 is stored on a computational system that is electronically accessible. For example, the database 208 may be stored on a server, a desktop computer, an HDD, an SSD, or any other suitable computing system.

Figure 3:
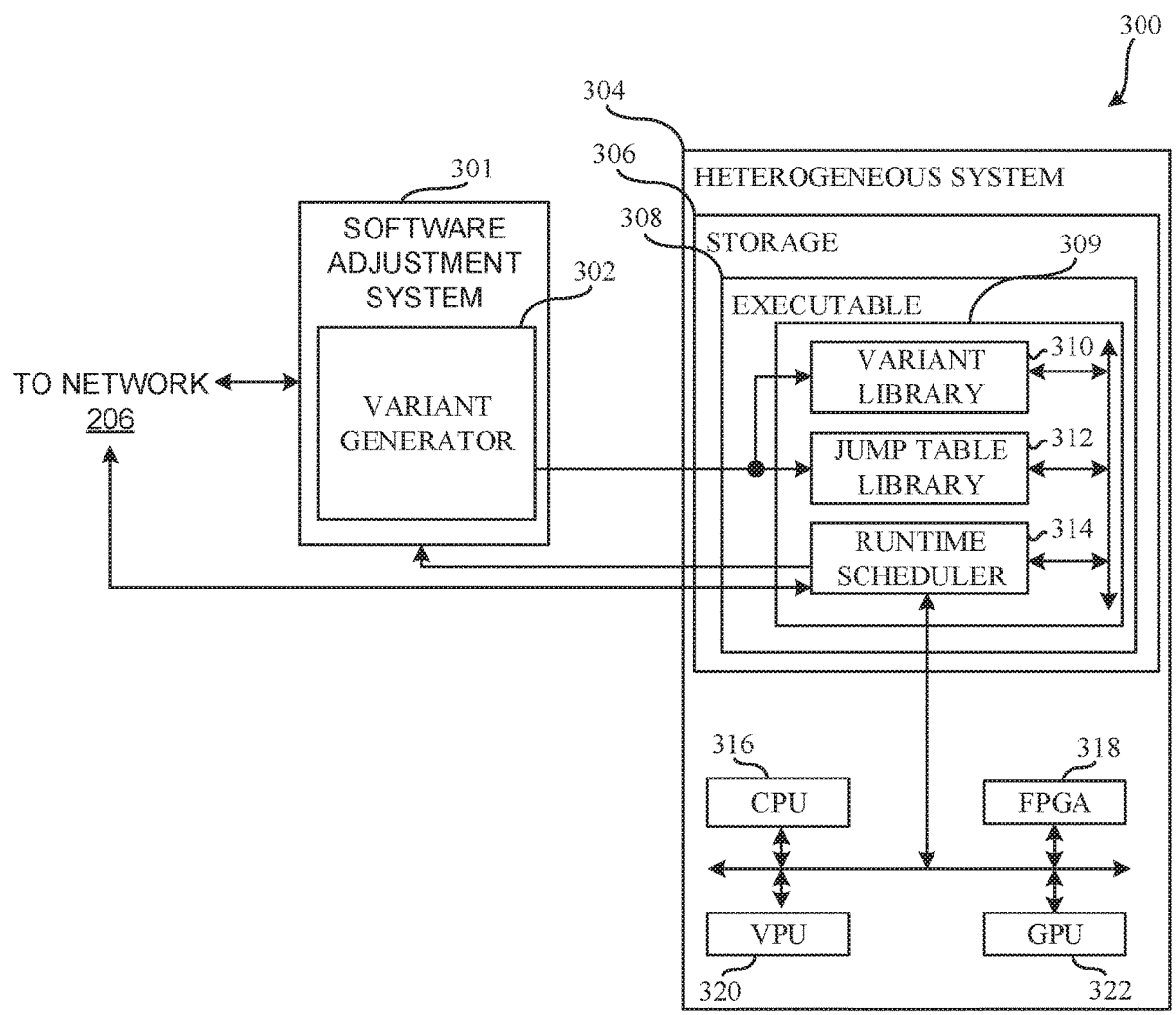
FIG. 3 depicts a block diagram illustrating an example variant generation system that may be used to implement a variant generator, the first software adjustment system, and/or the second software adjustment system of FIG. 2.

FIG. 3 depicts a block diagram illustrating an example system (e.g., a variant generation system) 300 that may be used to implement the first software adjustment system 204 and/or the second software adjustment system 210 of FIG. 2. The variant generation system 300 of FIG. 3 can facilitate operation of two or more ML/AI operational phases including a training phase and an inference phase.

In the illustrated example of FIG. 3, the variant generation system 300 includes a third example software adjustment system 301, an example variant generator 302, an example heterogeneous system 304, and example storage 306. Further depicted in the variant generation system 300 are the network 206 of FIG. 2 and the database 208 of FIG. 2. Alternatively, the variant generation system 300 may not include the network 206 and/or the database 208. Alternatively, the storage 306 may be external to the heterogeneous system 304. The storage 306 of FIG. 3 includes an example executable 308. The executable 308 includes an example fat binary (e.g., a fat binary file) 309 that includes an example variant library 310, an example jump table library 312, and an example runtime scheduler 314. Alternatively, the storage 306 may include more than one executable.

In the illustrated example of FIG. 3, the third software adjustment system 301 can correspond to the first software adjustment system 204 of FIG. 2 or the second software adjustment system 210 of FIG. 2. In FIG. 3, the heterogeneous system 304 can correspond to the heterogeneous system 100 of FIG. 1. In FIG. 3, the storage 306 can correspond to the storage 104 of FIG. 1. In FIG. 3, the executable 308 can correspond to the executable 105 of FIG. 1.

In the illustrated example of FIG. 3, the heterogeneous system 304 includes an example CPU 316, an example FPGA 318, an example VPU 320, and an example GPU 322. Alternatively, the heterogeneous system 304 may include fewer or more processing elements than depicted in FIG. 3. Alternatively, the heterogeneous system 304 may include more than one of the CPU 316, the FPGA 318, the VPU 320, and/or the GPU 322. In FIG. 3, the CPU 316 can correspond to the CPU 102 of FIG. 1. In FIG. 3, the FPGA 318 can correspond to the FPGA 106 of FIG. 1. In FIG. 3, the VPU 320 can correspond to the VPU 108 of FIG. 1. In FIG. 3, the GPU 322 can correspond to the GPU 110 of FIG. 1.

In the illustrated example of FIG. 3, the third software adjustment system 301 includes the variant generator 302. Alternatively, the variant generator 302 may be separate from the third software adjustment system 301. In FIG. 3, the variant generator 302 is depicted separately from the heterogeneous system 304. For example, the variant generator 302 may be located at a remote facility (e.g., remote with respect to the heterogeneous system 304). In such examples, the variant generator 302 can correspond to and/or otherwise be implemented by a cluster of computers (e.g., a cloud computing environment, a server room, etc.). Alternatively, the variant generator 302 may be included in and/or otherwise be implemented by the heterogeneous system 304.

In the illustrated example of FIG. 3, the variant generator 302 can be coupled to one or more external devices (e.g., the administrator device 202, the first software adjustment system 204, the second software adjustment system 210, the database 208, etc., of FIG. 2) via the network 206 of FIG. 2. In FIG. 3, the variant generator 302 is coupled to the storage 306, the variant library 310, the jump table library 312, and the runtime scheduler 314. The variant generator 302 may receive algorithms and/or machine learning models via the network 206. For example, in a training phase, the variant generator 302 may receive and/or otherwise obtain algorithms (e.g., random or randomly-selected algorithms) from the second software adjustment system 210, the database 208, etc., of FIG. 2 to train the untrained ML/AI model 212 of FIG. 2. In other examples, in an inference phase, the variant generator 302 can receive and/or otherwise obtain user-generated algorithms and/or trained ML/AI models (e.g., the trained ML/AI model 214 of FIG. 2) from the second software adjustment system 210, the database 208, etc., of FIG. 2.

In the illustrated example of FIG. 3, the variant generator 302 is a device or a software executable executed by the device that compiles one or more algorithms into an executable application including a number of variants of the algorithms. Additionally or alternatively, the variant generator 302 may generate trained ML/AI models associated with generating applications to be run on the heterogeneous system 304. For example, if algorithms are written in a programming language such as C or C++, the variant generator 302 can compile the algorithms into executable applications for storage in the storage 306 of FIG. 3. In some examples, the executable applications compiled by the variant generator 302 are fat binaries. Alternatively, the executable application compiled by the variant generator 302 may be any other suitable binary or executable file.

In the illustrated example of FIG. 3, the variant generator 302 utilizes ML/AI techniques. In some examples, the variant generator 302 utilizes a convolution neural network (CNN) model, a deep neural network (DNN) model, etc. In general, machine learning models/architectures that are suitable to use in the examples disclosed herein will be supervised. However, other examples may include machine learning models/architectures that utilize unsupervised learning. In some examples, the ML/AI models disclosed herein are trained using gradient descent. In some examples, the hyperparameters utilized to train the ML/AI model disclosed herein control the exponential decay rates of the moving averages of the gradient descent. Such hyperparameters are selected by, for example, iterating through a grid of hyperparameters until the hyperparameters meet and/or otherwise satisfy an acceptable or pre-defined value of performance. Additionally or alternatively, any other ML/AI training algorithm may be used.

In the illustrated example of FIG. 3, during the training phase, the variant generator 302 executes, functions, and/or otherwise operates to generate the trained ML/AI model 214 that is capable of generating an executable application that includes multiple variants of one or more algorithms that can be executed on a variety of processing elements. When in the training phase, the variant generator 302 selects a processing element (e.g., the CPU 316, the FPGA, 318, the VPU 320, or the GPU 322) for which the variant generator 302 is to develop one or more variants and a corresponding executable application. In response to selecting a processing element of interest, for example the FPGA 318, the variant generator 302, when in the training phase, selects an aspect of the processing element to optimize. For example, the variant generator 302 may select a speed of execution of the algorithm on the FPGA 318 to optimize.

In the illustrated example of FIG. 3, in response to selecting the aspect of the processing element to optimize, the variant generator 302 utilizes a machine learning model (e.g., a CNN, a DNN, etc.) to generate a cost model of the processing element. The variant generator 302 utilizes auto-tuning techniques to develop a schedule to map the algorithm to the selected processing element to improve the selected aspect. For example, the variant generator 302 can utilize auto-tuning techniques to develop a schedule to map the algorithm to the FPGA 318 so that the mapping of the algorithm to the FPGA 318 improves the speed of execution of the algorithm on the FPGA 318.

In the illustrated example of FIG. 3, in response to developing a schedule for the selected processing element, the variant generator 302 compiles the algorithm into a variant (e.g., a variant binary, a variant binary file, etc.) according to the schedule. The compilation of the algorithm differs from the compilation of the executable application because the variant generator 302 is compiling the algorithm into a method, class, and/or object that can be called or invoked by the executable application (e.g., the executable 308). In response to compiling the variant, the variant generator 302, when in the training phase, transmits the variant to the executable 308 in the storage 306. For example, the executable 308 can include the fat binary 309 stored in the storage 306 and the variant generator 302 can store the variant in the variant library 310 of the executable 308. In some examples, the variant generator 302, when in the training phase, transmits a variant symbol to the executable 308 in the storage 306. The variant symbol is a data element that corresponds to a location of the variant in the variant library 310.

In the illustrated example of FIG. 3, the variant is subsequently executed on the heterogeneous system 304. In response to executing the variant on the heterogeneous system 304, the variant generator 302 can obtain performance characteristics associated with the selected processing element (e.g., the FPGA 318). The performance characteristics, when in training mode, can correspond to characteristics of the selected processing element (e.g., the FPGA 318) including, for example, power consumption of the selected processing element, time to run on the selected processing element, and/or other performance characteristics associated with the selected processing element.

In the illustrated example of FIG. 3, the variant generator 302 analyzes the collected data and determines whether the variant used met a performance threshold. In some examples, training is performed until the performance threshold is met. For example, the performance threshold can correspond to an acceptable amount of L2 (least squares regression) error achieved for the selected aspect. In response to meeting the performance threshold, the variant generator 302 can determine whether there are subsequent aspects to be optimized. In response to determining that there is at least one subsequent aspect to be optimized, the variant generator 302 can generate an additional variant corresponding to the subsequent aspect for the selected processing element (e.g., power consumption for the FPGA 318). In response to determining that there is not another aspect to be optimized, the variant generator 302 can determine whether there is at least one subsequent processing element of interest to process to generate one or more corresponding variants (e.g., first variants generated for the CPU 316, second variants generated for the VPU 320, and/or third variants generated for the GPU 322 as opposed to fourth variants generated (e.g., previously generated) for the FPGA 318).

In the illustrated example of FIG. 3, in response to the variant generator 302 generating variants for all the processing elements of the heterogeneous system 304, the variant generator 302 determines whether there is at least one additional algorithm for which to generate variants. In response to determining that there is another algorithm to process, the variant generator 302 can generate variants of the additional algorithm for each processing element of the heterogeneous system 304 for any selected and/or arbitrary aspects of each of the processing elements. In response to determining that there are no additional algorithms of interest to process, the variant generator 302 outputs the trained ML/AI model 214. For example, the variant generator 302 may output one or more files including weights associated with the cost model of each processing element of the heterogeneous system 304. The model may be stored in the database 208, the storage 306, and/or a different variant generator than depicted in FIG. 3. The trained ML/AI model 214 may be executed by the variant generator 302 on a subsequent execution or a different variant generator than depicted in FIG. 3.

In the illustrated example of FIG. 3, in response to outputting and/or otherwise generating the trained ML/AI model 214, the variant generator 302 monitors for any additional input data. For example, the input data may correspond to data associated with the execution of an application generated by the trained ML/AI model 214 on a target platform (e.g., the heterogeneous system 304). The specific data obtained by the variant generator 302 can be indicative of the performance of the target platform when executing a desired workload and can reflect the actual system under an actual load different from a test system under a simulated load. In response to receiving and/or otherwise obtaining input data, the variant generator 302 can identify the success function of the heterogeneous system 304. Based on the success function, the variant generator 302 can determine a performance delta corresponding to a difference between the desired performance (e.g., a performance threshold) defined by the success function and the actual performance achieved during execution of the algorithm during the inference phase.

In the illustrated example of FIG. 3, in response to the variant generator 302 determining at least one of (1) the success function, (2) related aspect(s) of the overall system (e.g., the heterogeneous system 304) to target, or (3) the performance delta associated with the success function, the variant generator 302 updates and/or otherwise adjusts the cost model(s) associated with the respective processing elements of the heterogeneous system 304 to account for the real-time characteristics and load (e.g., load profile) of the heterogeneous system 304. The updating and other adjustment of the cost model(s) associated with the respective processing elements of a heterogeneous system is described below in connection with FIG. 4.

In the illustrated example of FIG. 3, the variant library 310 is a data structure associated with the executable 308 that stores the different variants of an algorithm that the executable 308 can perform. For example, the variant library 310 can correspond to a data section of the fat binary 309 that includes the different variants associated with a particular algorithm, such as variants associated with the respective processing elements of the heterogeneous system 304. For one or more processing elements, the variant library 310 may additionally include variants that target different aspects of performance of the respective one or more processing elements. In some examples, the variant library 310 is linked to at least one of the jump table library 312 or the runtime scheduler 314. In some examples, the variant library 310 is a static library during execution of the executable 308 but may be updated with new or altered variants between executions of the executable 308.

In the illustrated example of FIG. 3, the jump table library 312 is a data structure associated with the executable 308 that stores one or more jump tables that include variant symbols pointing to locations of respective variants in the variant library 310. For example, the jump table library 312 can correspond to a data section of the executable 308 that includes a jump table including associations of variant symbols (e.g., pointers) and respective variants located in the variant library 310. In some examples, the jump table library 312 does not change during execution of the executable 308. In such examples, the jump table library 312 can be accessed to call, instruct, and/or otherwise invoke a respective variant to be loaded onto one or more of the processing elements of the heterogeneous system 304.

In the illustrated example of FIG. 3, the runtime scheduler 314 determines how to execute a workload (e.g., one or more algorithms) during runtime of the heterogeneous system 304. In some examples, the runtime scheduler 314 generates and/or transmits execution graphs to a processing element to execute and/or otherwise implement. In some examples, the runtime scheduler 314 determines whether a workload should be offloaded from one processing element to a different processing element to achieve a performance goal associated with the overall heterogeneous system 304. In FIG. 3, during execution of the executable 308, the runtime scheduler 314 can monitor the heterogeneous system 304 to profile a performance of the heterogeneous system 304 based on performance characteristics obtained from the executable 308. In some examples, the runtime scheduler 314 can determine to offload a workload from one processing element to another based on the performance. For example, during runtime of the heterogeneous system 304, the executable 308 can be executed by the CPU 316 and, based on the performance of the CPU 316 and/or, more generally, the heterogeneous system 304, the runtime scheduler 314 can offload a workload scheduled to be executed by the CPU 316 to the FPGA 318. In some examples, the CPU 316 executes the executable 308 from the storage 306 while, in other examples, the CPU 316 can execute the executable 308 locally on the CPU 316.

In the illustrated example of FIG. 3, in response to the CPU 316 executing the executable 308, the runtime scheduler 314 determines a success function. For example, during a training phase, the success function can be associated with a processing element of interest (e.g., the GPU 322) for which the untrained ML/AI model 212 of FIG. 2 is being trained. In contrast to operating in the training phase, where the runtime scheduler 314 determines a success function for a processing element of interest, when operating in the inference phase, the runtime scheduler 314 can determine a system-wide success function. For example, a first system-wide success function may be associated with executing an algorithm with the executable 308 by consuming less than or equal to a threshold amount of power. In other examples, a second system-wide success function can be associated with executing the algorithm with the executable 308 as quickly as possible without consideration for power consumption.

In some examples, the system-wide success function(s) are based on an overall state of the heterogeneous system 304. For example, if the heterogeneous system 304 is included in a laptop computer in a low-power mode (e.g., a battery of the laptop computer is below a threshold battery level, the laptop computer is not connected to a battery charging source, etc.), the system-wide success function(s) may be associated with conserving power. In other examples, if the heterogeneous system 304 is included in the laptop computer in a normal-power mode (e.g., the battery is fully charged or substantially fully charged) or operating under normal operating conditions of the laptop computer, the system-wide success function can be associated with speed of execution of the algorithm as conserving power may not be a concern.

In the illustrated example of FIG. 3, the success function can be specific to the processing elements of the heterogeneous system 304. For example, the success function may be associated with utilizing the GPU 322 beyond a threshold amount, preventing contention between CPU 316 threads, or utilizing the high-speed memory of the VPU 320 beyond a threshold amount. In some examples, a success function can be a composite of simpler success functions, such as overall performance of the heterogeneous system 304 per unit of power.

In the illustrated example of FIG. 3, in response to identifying a success function, the runtime scheduler 314 executes the executable 308 based on the variant(s) generated by a ML/AI model. For example, during the training phase, the untrained ML/AI model 212 that generated the variants is not trained and the runtime scheduler 314 is concerned with the specific performance of the processing element with which the untrained ML/AI model 212 is being trained. However, during the inference phase, the trained ML/AI model 214 that generated the variants is trained and the runtime scheduler 314 is concerned with the specific performance of the heterogeneous system 304 with respect to an entirety or a substantial portion of the heterogeneous system 304. For example, during the inference phase, the runtime scheduler 314 may collect specific performance characteristics associated with the heterogeneous system 304 and can store and/or transmit the performance characteristics in the database 208, the storage 306, etc.

In the illustrated example of FIG. 3, during an inference phase, the runtime scheduler 314 collects performance characteristics including metadata and metric information associated with each variant included in the executable 308. For example, such metadata and metric information can include an identifier for the workload (e.g., a name of the algorithm), compatibility constraints associated with drivers and other hardware of the heterogeneous system 304, a version of the cost model utilized to generate a variant, an algorithm execution size, and other data that ensures compatibility between execution of a workload and one or more processing elements. In such examples, the runtime scheduler 314 can determine offload decisions based on the metadata and metric information. The performance characteristics collected during an inference phase by the runtime scheduler 314 may further include average execution time of a variant on each processing element, an average occupancy of each processing element during runtime, stall rate(s), power consumption of the individual processing elements, computational cycle counts utilized by a processing element, memory latency when offloading a workload, hazards of offloading a workload from one processing element to another, system-wide battery life, an amount of memory utilized, metrics associated with a communication bus between the various processing elements, metrics associated with the storage 306 of the heterogeneous system 304, etc., and/or a combination thereof.

In the illustrated example of FIG. 3, the runtime scheduler 314, during an inference phase, collects data associated with state transition data corresponding to load and environmental conditions of the heterogeneous system 304 (e.g., why the runtime scheduler 314 accessed the jump table library 312, where/why the runtime scheduler 314 offloaded the workload, etc.). In some examples, the state transition data includes runtime scheduling rules associated with thermal and power characteristics of the heterogeneous system 304 as well as runtime scheduling rules associated with any other condition that may perturb (e.g., influence) the performance of the heterogeneous system 304.

In the illustrated example of FIG. 3, in response to monitoring and/or collecting the performance characteristics, the runtime scheduler 314 adjusts a configuration of the heterogeneous system 304 based on the success function of the heterogeneous system 304. For example, periodically, throughout the operation of the runtime scheduler 314, during an inference phase, the runtime scheduler 314 may store and/or transmit the performance characteristics for further use by the variant generator 302. In such examples, the runtime scheduler 314 can identify whether the heterogeneous system 304 includes persistent storage (e.g., ROM, PROM, EPROM, etc.), a persistent BIOS, or a flash storage.

In the illustrated example of FIG. 3, if the heterogeneous system 304 includes a persistent storage, the runtime scheduler 314 writes to a data section in the executable 308 (e.g., the fat binary 309) to store the performance characteristics. The performance characteristics can be stored in the executable 308 to avoid a possibility of history loss across different executions of the executable 308. In some examples, the runtime scheduler 314 executes on the CPU 316 as an image of the executable 308. In such examples, the runtime scheduler 314 can store the performance characteristics in the executable 308 stored in the storage 306. If the heterogeneous system 304 does not include a persistent storage, but rather includes a flash storage or a persistent BIOS, a similar method of storing the performance characteristic in the executable 308 may be implemented.

In the illustrated example of FIG. 3, if there is no form or instance of a persistent storage, a persistent BIOS, or a flash storage (for example, if the storage 306 is a volatile memory) available, the runtime scheduler 314 may alternatively transmit the collected performance characteristics to an external device (e.g., the database 208, the variant generator 302, etc., and/or a combination thereof) utilizing a port of a communication interface. For example, the runtime scheduler 314 may utilize a universal serial bus (USB), an ethernet, a serial, or any other suitable communication interface to transmit the collected performance characteristics to an external device.

In the illustrated example of FIG. 3, in response to the heterogeneous system 304 executing the executable 308, the runtime scheduler 314 transmits the performance characteristics as well as a performance delta associated with the system wide success function to an external device. The performance delta may indicate, for example, the difference in the desired performance and the performance achieved.

In the illustrated example of FIG. 3, on subsequent executions of the executable 308, the runtime scheduler 314 can access the stored performance characteristics and adjust and/or otherwise improve ML/AI models (e.g., the trained ML/AI model 214) to improve the handling and/or facilitation of offloading workloads to processing elements. For example, the runtime scheduler 314 may access stored performance characteristics to adjust the trained ML/AI model 214. In such examples, the stored performance characteristics can include data corresponding to bus traffic under load, preemptive actions taken by an operating system of the heterogeneous system 304, decoding latencies associated with audio and/or video processing, and/or any other data that can be used as a basis for determining an offloading decision. For example, if the runtime scheduler 314 encounters an algorithm that includes decoding video, the runtime scheduler 314 may schedule video decoding tasks initially on the GPU 322. In such examples, the runtime scheduler 314 can have a variant available for a different processing element (e.g., the VPU 320) that, in isolation, can process the video decoding tasks quicker than the variant executing on the GPU 322. However, the runtime scheduler 314 may decide not to offload the video decoding tasks to the different processing element because memory movement latencies associated with moving the workload from the GPU 322 to the different processing element can take the same or an increased amount of time compared to keeping the workload on the GPU 322.

Figure 4:
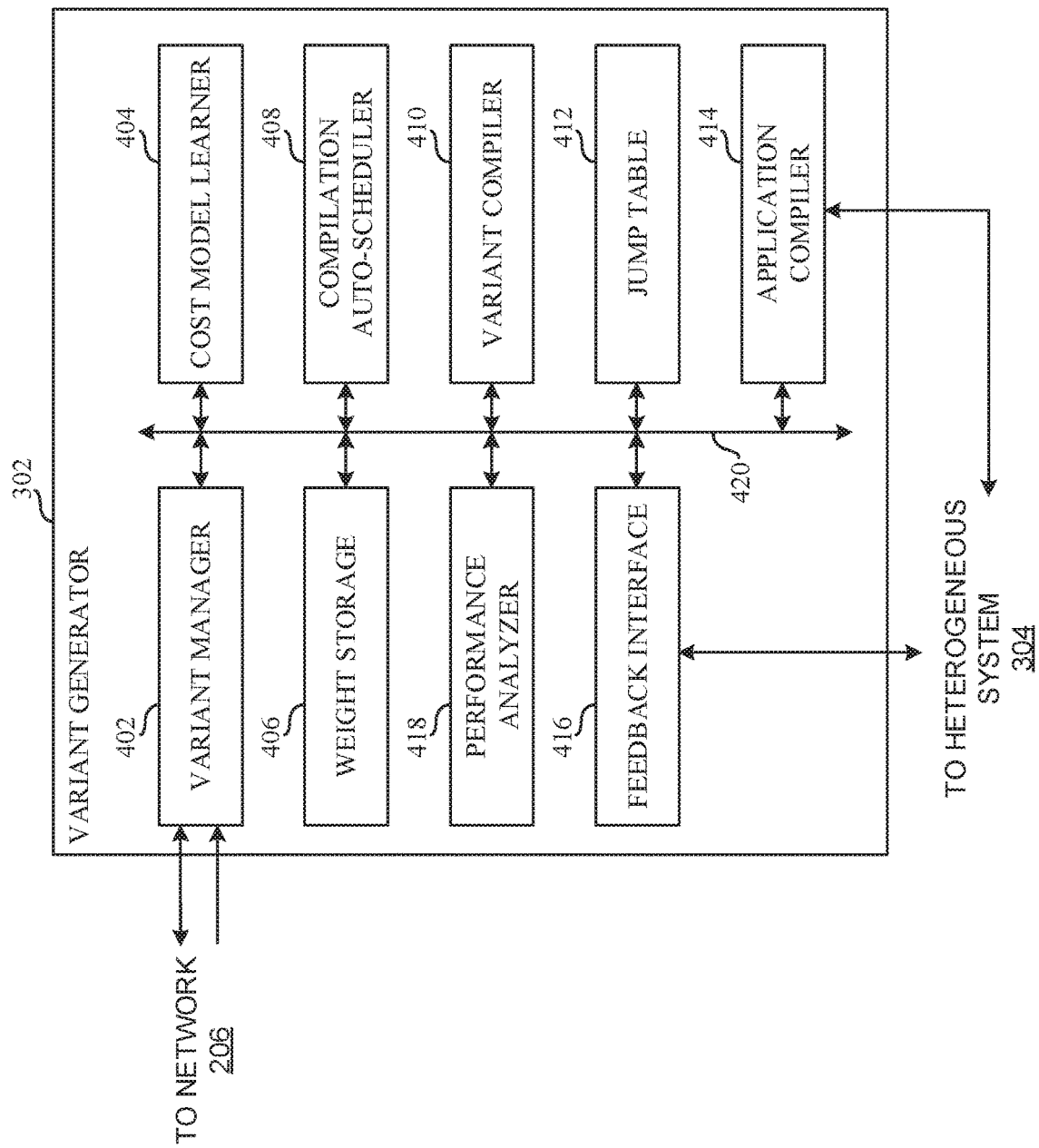
FIG. 4 depicts a block diagram illustrating an example implementation of the variant generator of FIG. 3.

FIG. 4 depicts a block diagram illustrating an example implementation of the variant generator 302 of FIG. 3. In the illustrated example of FIG. 4, the variant generator 302 includes an example variant manager 402, an example cost model learner 404, an example weight storage 406, an example compilation auto-scheduler 408, an example variant compiler 410, an example jump table 412, an example application compiler 414, an example feedback interface 416, and an example performance analyzer 418.

In some examples, one or more of the variant manager 402, the cost model learner 404, the weight storage 406, the compilation auto-scheduler 408, the variant compiler 410, the jump table 412, the application compiler 414, the feedback interface 416, and/or the performance analyzer 418 is/are in communication with one or more of the other elements of the variant generator 302. For example, the variant manager 402, the cost model learner 404, the weight storage 406, the compilation auto-scheduler 408, the variant compiler 410, the jump table 412, the application compiler 414, the feedback interface 416, and the performance analyzer 418 can be in communication with each other via an example communication bus 420. For example, the communication bus 420 may correspond to an interface circuit or any other type of hardware or logic circuit to facilitate inter-element communication.

In some examples, the variant manager 402, the cost model learner 404, the weight storage 406, the compilation auto-scheduler 408, the variant compiler 410, the jump table 412, the application compiler 414, the feedback interface 416, and the performance analyzer 418 may be in communication via any suitable wired and/or wireless communication method. In some examples, each of the variant manager 402, the cost model learner 404, the weight storage 406, the compilation auto-scheduler 408, the variant compiler 410, the jump table 412, the application compiler 414, the feedback interface 416, and the performance analyzer 418 may be in communication with any component exterior to the variant generator 302 via any suitable wired and/or wireless communication method.

In the illustrated example of FIG. 4, the variant generator 302 includes the variant manager 402 to analyze communications received and/or otherwise obtained from devices external to the variant generator 302 (e.g., the database 208, the administrator device 202 of FIG. 2, etc., and/or a combination thereof) and manage operation of one or more components of the variant generator 302. In some examples, the variant manager 402 receives and/or otherwise obtains an algorithm from an external device. For example, during a training phase, the variant manager 402 may obtain an arbitrary algorithm in a series or collection of arbitrary algorithms that are utilized to train the variant manager 402. Additionally or alternatively, during an inference phase, the variant manager 402 may obtain an algorithm associated with a workload to be executed on the heterogeneous system 304 of FIG. 3.

In the illustrated example of FIG. 4, in response to obtaining an algorithm from an external device, the variant manager 402 can select a processing element for which to generate a cost model and/or variant. For example, the processing element may be one of the CPU 316, the FPGA 318, the VPU 320, or the GPU 322 of FIG. 3. The variant manager 402 may additionally select an aspect of the selected processing element to target for a success function. For example, during a training phase, the variant manager 402 may select power consumption of the GPU 322 to target for a success function associated with the GPU 322. In some examples, during an inference phase, the variant manager 402 selects an aspect associated with a predetermined success function provided by a user (e.g., an administrator, a developer, etc.). In some examples, the variant manager 402 selects multiple aspects to target to provide a runtime scheduler (e.g., the runtime scheduler 314 of FIG. 3) with a variety of variants to choose from based on the performance characteristics of the heterogeneous system 304.

In some examples, in response to generating a variant and determining that the variant meets a performance threshold associated with the success function, the variant manager 402 determines whether there are any additional aspects of the selected processing element to target, whether there are additional processing elements to generate variants for, and/or whether there are any additional algorithms with which to train the cost model learner 404. In response to determining that there are one or more additional aspects, one or more additional processing elements, and/or one or more additional algorithms of interest to process, the variant manager 402 may repeat the above actions. In response to determining that there are no additional aspects, additional processing elements, and/or additional algorithms, the variant manager 402 may output the weights associated with the respective trained ML/AI models (e.g., the trained ML/AI model 214 of FIG. 2) corresponding to the respective processing elements of the heterogeneous system 304.

In some examples, the variant generator 302 includes the variant manager 402 to obtain a configuration of a hardware target of interest. For example, the variant manager 402 may obtain a configuration (e.g., a target configuration) associated with the heterogeneous system 304 of FIG. 3. In such examples, the variant manager 402 can obtain a target configuration from the database 208, the heterogeneous system 304, etc., and/or a combination thereof. The target configuration may include information indicative of the heterogeneous system 304 including the CPU 316, the FPGA 318, the VPU 320, and the GPU 322 of FIG. 3.

In the illustrated example of FIG. 4, the variant generator 302 includes the cost model learner 404 to implement and/or otherwise facilitate the execution of one or more ML/AI techniques to generate trained ML/AI models associated with generating applications to be run on a heterogeneous system. In some examples, the cost model learner 404 implements a supervised DNN to learn and improve cost models associated with processing elements. However, in other examples, the cost model learner 404 may implement any suitable ML/AI model with supervised and/or unsupervised learning. In some examples, the cost model learner 404 implements a CNN, a DNN, etc., for each processing element of the heterogeneous system 304.

In the illustrated example of FIG. 4, the variant generator 302 includes the weight storage 406 as a memory where the weights can be associated with one or more cost models for respective ones of the processing elements of the heterogeneous system 304. In some examples, the weights are stored in a file structure where each cost model has a respective weight file. Alternatively, a weight file may be used for more than one cost model. In some examples, the weight files are read during a compilation auto-scheduling event (e.g., an event executed by the compilation auto-scheduler 408) and in response to the variant manager 402 outputting and/or otherwise generating the trained ML/AI model 214. In some examples, weights are written to the weight files in response to the cost model learner 404 generating a cost model.

In the example illustrated of FIG. 4, the variant generator 302 includes the compilation auto-scheduler 408 to generate a schedule associated with the algorithm for the selected processing element based on the cost model (e.g., the weight file) generated by the cost model learner 404. In some examples, the compilation auto-scheduler 408 implements second means for generating a schedule based on configurations for processing elements of the heterogeneous system 304. For example, the second means for generating may be implemented by one or more analog or digital circuit(s), logic circuits, programmable processor(s), programmable controller(s), GPU(s), DSP(s), application specific integrated circuit(s) (ASIC(s)), PLD(s), and/or FPLD(s).

In some examples, a schedule can correspond to a method or order of operations associated with computing and/or otherwise processing an algorithm, where the schedule can include at least one of choices or decisions about memory locality, redundant computation, or parallelism. In some examples, the compilation auto-scheduler 408 generates a schedule through the use of auto-tuning. Alternatively, any suitable auto-scheduling method may be used to generate a schedule associated with the algorithm for the selected processing element.

In some examples, the compilation auto-scheduler 408 selects and/or otherwise identifies a processing element (e.g., a hardware target) to process. For example, the compilation auto-scheduler 408 may select the CPU 316 of FIG. 3 to process. The compilation auto-scheduler 408 can configure one or more auto-schedulers included in the compilation auto-scheduler 408 for the processing element based on a corresponding configuration. For example, the compilation auto-scheduler 408 may be configured based on the target configuration associated with the CPU 316. In such examples, the compilation auto-scheduler 408 can be configured based on a hardware architecture, scheduling heuristics, etc., associated with the CPU 316.

In the illustrated example of FIG. 4, the variant generator 302 includes the variant compiler 410 to compile the schedule generated by the compilation auto-scheduler 408. In some examples, the variant compiler 410 compiles the algorithm into a method, class, or object that can be called or invoked by an executable application. In response to compiling the variant, the variant compiler 410 can transmit the variant to an application to be compiled. In some examples, the variant compiler 410 transmits the variant to the jump table 412.

In some examples, the variant compiler 410 compiles the variant binaries 502, 504, 506, 508, 510 based on the schedule. In some examples, the variant compiler 410 implements means for compiling the variant binaries 502, 504, 506, 508, 510 based on the schedule. For example, the means for compiling may be implemented by one or more analog or digital circuit(s), logic circuits, programmable processor(s), programmable controller(s), GPU(s), DSP(s), application specific integrated circuit(s) (ASIC(s)), PLD(s), and/or FPLD(s).

In some examples, the variant generator 302 includes the variant compiler 410 to generate a representation of one or more algorithms in a domain specific language (DSL). For example, the variant compiler 410 may convert, translate, and/or otherwise generate a Halide representation of an algorithm. In some examples, the variant compiler 410 implements first means for generating a representation of an algorithm in a DSL. For example, the first means for generating may be implemented by one or more analog or digital circuit(s), logic circuits, programmable processor(s), programmable controller(s), GPU(s), DSP(s), application specific integrated circuit(s) (ASIC(s)), PLD(s), and/or FPLD(s). Alternatively, the variant compiler 410 may generate any other type of representation (e.g., separation of concern representation) of the algorithm and/or use any other type of DSL.

In the illustrated example of FIG. 4, the variant generator 302 includes the jump table 412 to associate the different variants generated by the variant compiler 410 with a location where the respective variants are located (e.g., are to be located) in an executable application (e.g., the fat binary 309). In some examples, the jump table 412 associates the different variants with a respective location of the different variants in an executable application via a variant symbol (e.g., a pointer) that points to the location of the respective variant in the executable application.

Figure 5:
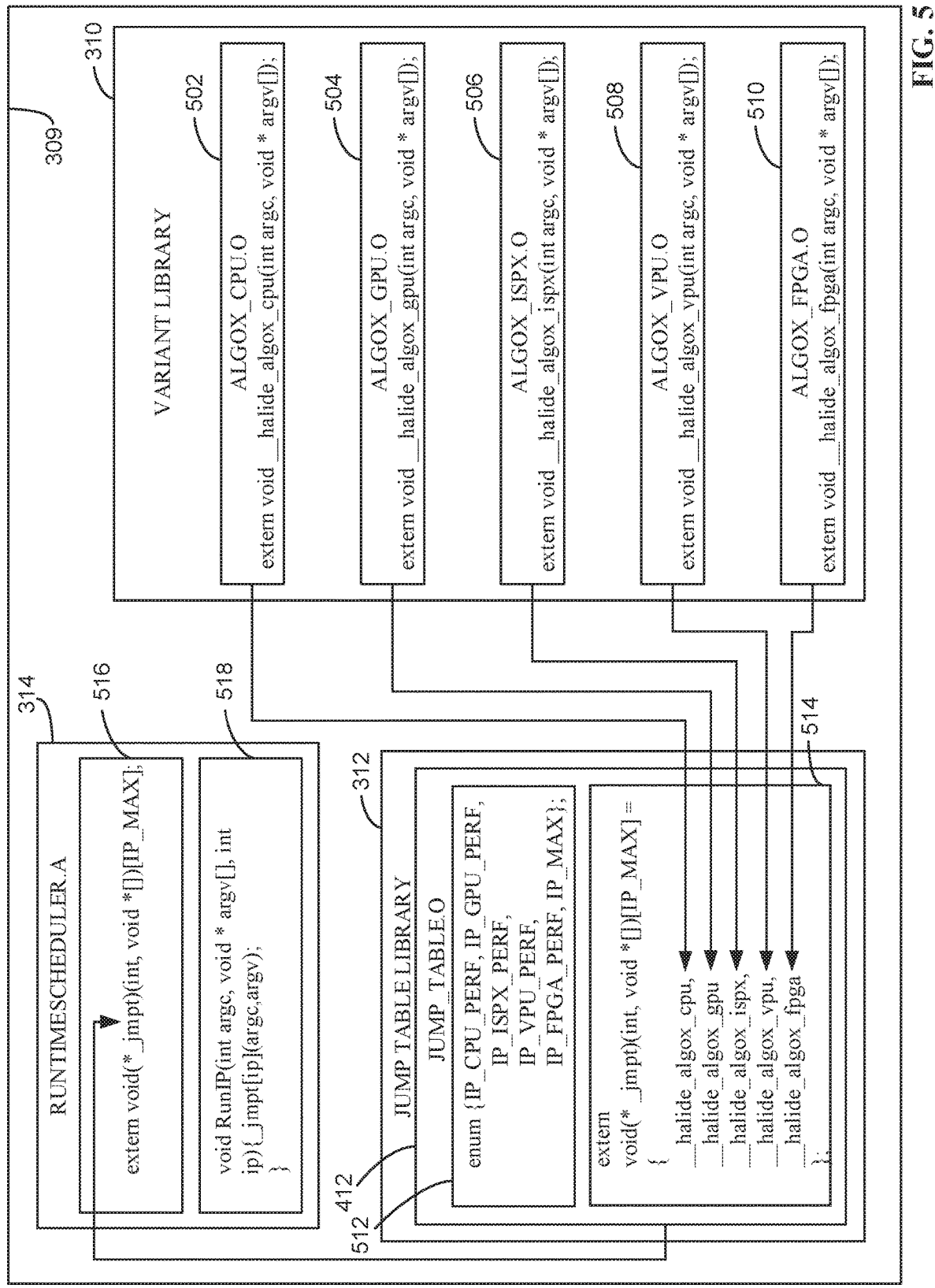
FIG. 5 depicts an example fat binary including a variant library, a jump table library, and a runtime scheduler to implement the examples disclosed herein.

Turning to FIG. 5, the illustrated example depicts the fat binary 309 of FIG. 3 including the variant library 310, the jump table library 312, and the runtime scheduler 314 of FIG. 3. In the illustrated example of FIG. 5, the fat binary 309 includes the variant library 310 to store example variant binaries 502, 504, 506, 508, 510 including a first example variant binary 502, a second example variant binary 504, a third example variant binary 506, a fourth example variant binary 508, and a fifth example variant binary 510. Alternatively, the variant library 310 may include one variant binary or a different quantity of variant binaries than depicted in FIG. 5. In FIG. 5, the variant binaries 502, 504, 506, 508, 510 are based on Halide. Alternatively, one or more of the variant binaries 502, 504, 506, 508, 510 may be based on a different DSL, such as OpenCL.

In the illustrated example of FIG. 5, the first variant binary 502 is a CPU variant binary and corresponds to a compilation of an algorithm according to a first schedule based on a first target configuration of the CPU 316 of FIG. 3. In FIG. 5, the second variant binary 504 is a GPU variant binary and corresponds to a compilation of the algorithm according to a second schedule based on a second target configuration of the GPU 322 of FIG. 3. In FIG. 5, the third variant binary 506 is an iStudio Publisher (ISPX) variant binary and corresponds to a compilation of the algorithm according to a third schedule based on a third target configuration corresponding to one of the CPU 316, the FPGA 318, the VPU 320, or the GPU 322 of FIG. 3. In FIG. 5, the fourth variant binary 508 is a VPU variant binary and corresponds to a compilation of the algorithm according to a fourth schedule based on a fourth target configuration of the VPU 320 of FIG. 3. In FIG. 5, the fifth variant binary 510 is an FPGA variant binary and corresponds to a compilation of the algorithm according to a fifth schedule based on a fifth target configuration of the FPGA 318 of FIG. 3. Accordingly, the fat binary 309 of FIGS. 3 and/or 5 includes multiple versions (e.g., multiple binary versions, multiple schedule versions, etc.) of the same algorithm implemented on a spectrum of processing elements available on target heterogeneous systems (e.g., the heterogeneous system 304 of FIG. 3).

In the illustrated example of FIG. 5, the jump table library 312 includes one or more jump tables including the jump table 412 of FIG. 4. In FIG. 5, the jump table 412 includes example metadata 512 corresponding to information about correct or desired usage of a respective processing element, performance characteristics, and workload characteristics generated in response to a workload being executed on a respective processing element. In FIG. 5, the metadata 512 includes the data structure "IP_CPU_PERF" that can correspond to Data associated with at least one of (1) correct or desired usage of the CPU 316, (2) performance characteristics of the CPU 316 that can be representative of values of Performance counters or execution graphs, or (3) workload characteristics associated with data generated by the CPU 316 or a performance monitoring unit (PMU) monitoring the CPU 316, where the data is generated in response to the CPU 316 executing a workload.

In the illustrated example of FIG. 5, the jump table 412 includes example symbols (e.g., entry-point symbols, variant symbols, etc.) 514. In FIG. 5, each of the symbols 514 corresponds to a respective one of the variant binaries 502, 504, 506, 508, 510. For example, the symbol "_halide_algox_cpu" can correspond to the first variant binary 502. In FIG. 5, the symbols 514 are based on Halide because the variant binaries 502, 504, 506, 508, 510 of FIG. 5 are based on Halide. Alternatively, one or more of the symbols 514 may be based on a different DSL, such as OpenCL, when a corresponding one of the variant binaries 502, 504, 506, 508, 510 are based on the different DSL.

In the illustrated example of FIG. 5, the fat binary 309 includes the runtime scheduler 314 to access and/or otherwise invoke the jump table 412 of the jump table library 312. In FIG. 5, the variant library 310 is linked to the jump table 412 via the symbols 514. In FIG. 5, the runtime scheduler 314 is linked to the jump table library 312 via an example jump function 516. In operation, the runtime scheduler 314 executes an example application function 518 to execute a workload associated with an algorithm. In operation, the runtime scheduler 314 executes the jump function 516 to determine a workload dispatch decision based on the metadata 512 (e.g., the metadata 512 that is collected in real-time or substantially real-time). In operation, the runtime scheduler 314 determines the workload dispatch decision by identifying one of the processing elements of FIG. 3 to use to execute the workload. For example, the runtime scheduler 314 may determine to use the GPU 322 based on the metadata 512. In such examples, the runtime scheduler 314 can select "_halide_algox_gpu" from the symbols 514 to invoke the second variant binary 504 to execute the workload.

Turning back to the illustrated example of FIG. 4, the variant generator 302 includes the application compiler 414 to compile the algorithms, respective variants, variant symbols, and/or a runtime scheduler (e.g., the runtime scheduler 314 of FIG. 3) into one or more executable applications (e.g., the executable 308) for storage. For example, the application compiler 414 can be in communication with the heterogeneous system 304 and store the one or more executable applications in the storage 306 of FIG. 3 of the heterogeneous system 304 of FIG. 3. In some examples, the application compiler 414 compiles the algorithms, respective variants, and the runtime scheduler as a compiled version of the original algorithm (e.g., code, human-readable instructions, etc.) received by the variant generator 302. For example, if the algorithm is written in a programming language such as C or C++, the application compiler 414 can compile the algorithm, the respective variants, variant symbols, and a runtime scheduler into an executable C or C++ application that includes the variants written in their respective languages for execution on respective processing elements.

In some examples, the executable applications compiled by application compiler 414 are fat binaries. For example, the application compiler 414 may compile an application to process one or more algorithms by assembling the executable 308 of FIGS. 3 and/or 7 by linking the runtime scheduler 314, the jump table library 312, and the variant library 310. For example, the application compiler 414 may generate the fat binary 309 of FIGS. 3 and/or 5 based on the one or more linkages. Alternatively, the executable application compiled by the application compiler 414 may be any suitable executable file.

In some examples, the application compiler 414 implements third means for generating the fat binary 309 including the runtime scheduler 314 to select one or more of the variant binaries 502, 504, 506, 508, 510 to execute a workload based on the schedule(s) (e.g., the one or more schedules generated by the compilation auto-scheduler 408). For example, the third means for generating may be implemented by one or more analog or digital circuit(s), logic circuits, programmable processor(s), programmable controller(s), GPU(s), DSP(s), application specific integrated circuit(s) (ASIC(s)), PLD(s), and/or FPLD(s).

In some examples, the application compiler 414 generates a jump table to be included in a jump table library. For example, the application compiler 414 may add the jump table 412 of FIG. 4 to the jump table library 312 of FIGS. 3 and/or 4. Accordingly, the application compiler 414 can generate the jump table library 312 in response to generating one or more jump tables, such as the jump table 412.

In the illustrated example of FIG. 4, the variant generator 302 includes the feedback interface 416 to interface between executable applications (e.g., the executable 308) running on a heterogeneous system (e.g., the heterogeneous system 304 of FIG. 3) and/or a storage facility (e.g., the database 208). For example, the feedback interface 416 may be a network interface, a USB port interface, an Ethernet port interface, or a serial port interface. During a training phase, the feedback interface 416 can collect performance characteristics associated with a selected processing element. During the training phase, the collected performance characteristics can correspond to a quantification of power consumption of the selected processing element, a time to run parameter on the selected processing element, and/or other performance characteristics associated with the selected processing element.

In the illustrated example of FIG. 4, during an inference phase, the feedback interface 416 can be configured to collect performance characteristics and the performance delta associated with the system wide success function. In some examples, the feedback interface 416 obtains (e.g., directly obtains) the performance characteristics from an application executing on a heterogeneous system and/or from a storage device exterior to the heterogeneous system.

In some examples, the feedback interface 416 implements means for obtaining a performance characteristic of the heterogeneous system 304 from the fat binary 309, the performance characteristic associated with one or more of the processing elements executing the workload at a first runtime, where the fat binary 309 executes according to a function designating successful execution of the fat binary 309 on the heterogeneous system 304. For example, the means for obtaining may be implemented by one or more analog or digital circuit(s), logic circuits, programmable processor(s), programmable controller(s), GPU(s), DSP(s), application specific integrated circuit(s) (ASIC(s)), PLD(s), and/or FPLD(s).

In the illustrated example of FIG. 4, the variant generator 302 includes the performance analyzer 418 to identify received data (e.g., performance characteristics). During a training phase, the performance analyzer 418 can determine whether the selected variant meets and/or otherwise satisfies a performance threshold. Moreover, during the training phase, the performance analyzer 418 can analyze the performance of a processing element to meet and/or otherwise satisfy a success function. During the initial training phase, the performance analyzer 418 can analyze the performance of an individual processing element in isolation and may not consider the overall context of the processing elements in a heterogeneous system. The analysis of the individual processing element can be fed back into the cost model learner 404 to assist the CNN, the DNN, etc., in analyzing and developing a more accurate cost model for the particular processing element compared to a previous cost model for the particular processing element.

In response to outputting and/or otherwise generating the trained ML/AI model 214 for deployment (e.g., use by an administrator, a developer, etc.), the performance analyzer 418, after receiving an indication that input data (e.g., runtime characteristics on an heterogeneous system under load) has been received (e.g., an indication from the feedback interface 416), the performance analyzer 418 can identify an aspect of the heterogeneous system to target based on the success function of the system and the performance characteristics. In some examples, the performance analyzer 418 determines the performance delta by determining a difference between the desired performance (e.g., a performance threshold) defined by the success function and the actual performance achieved during execution of the algorithm during the inference phase.

In some examples, the performance analyzer 418 implements means for determining a performance delta based on the performance characteristic and the function. For example, the means for determining may be implemented by one or more analog or digital circuit(s), logic circuits, programmable processor(s), programmable controller(s), GPU(s), DSP(s), application specific integrated circuit(s) (ASIC(s)), PLD(s), and/or FPLD(s). In some examples, the performance analyzer 418 implements means for adjusting, prior to a runtime, using a machine learning model, a cost model of one or more of the processing elements of the heterogeneous system 304 based on the performance delta. For example, the means for adjusting may be implemented by one or more analog or digital circuit(s), logic circuits, programmable processor(s), programmable controller(s), GPU(s), DSP(s), application specific integrated circuit(s) (ASIC(s)), PLD(s), and/or FPLD(s).

In some examples, during a subsequent training phase (e.g., a second training phase after a first training phase is complete), the additional empirical data obtained by the feedback interface 416 and utilized by the performance analyzer 418 may be re-inserted into the cost model learner 404 to adjust the one or more cost models of the individual processing element based on the contextual data associated with the system as a whole (e.g., the performance characteristics, such as, runtime load and environment characteristics).

In some examples, the cost model learner 404 executes and/or otherwise performs a variety of executable actions associated with the different cost models for the respective processing elements based on the contextual data. For example, based on the collected empirical data, the cost model learner 404 may adjust the cost models of the respective processing elements to invoke the compilation auto-scheduler 408 to generate schedules, utilizing the adjusted cost models, to perform a specified workload in a more desirable way (e.g., by using less power, taking less time to perform, etc.).

In some examples, in response to determining that the performance characteristics indicate that a particular variant is infrequently selected, the performance analyzer 418 can determine that variants targeting the particular aspect associated with that variant are not satisfactory candidates for workload offloading during runtime. Based on the determination, the performance analyzer 418 can instruct the variant manager 402 to not generate variants for the associated aspect and/or associated processing element. Advantageously, by not generating the additional variants, the variant manager 402 can reduce space on the application (e.g., the fat binary) generated by the application compiler 414 to reduce the memory consumed by the application when stored in memory.

In the illustrated example of FIG. 4, when utilizing the collected empirical data, the cost model learner 404 may additionally utilize additional CNNs, DNNs, etc., to generate multiple cost models associated with a specific processing element. Each cost model may be focused on a specific aspect of a specific processing element, and at runtime, a runtime scheduler (e.g., the runtime scheduler 314) can choose from a variety of variants to be used on the heterogeneous system 304 of FIG. 3. For example, if an overall system success function is associated with conserving power, the runtime scheduler 314 may utilize variants on all processing elements that are targeted at reducing power consumption. However, when comprehending the overall system performance under a runtime execution (e.g., by collecting empirical data), the cost model learner 404 may generate multiple variants targeting at least reducing power consumption and improving speed. At runtime, the runtime scheduler 314, implementing the examples disclosed herein, may determine that even executing a variant targeting improved speed is still within the bounds of the success function associated with conserving power. Advantageously, the runtime scheduler 314 can improve the performance of an overall heterogeneous system while still maintaining the functionality to satisfy the desired success function.

While an example manner of implementing the variant generator 302 of FIG. 3 is illustrated in FIG. 4 and an example manner of implementing the executable 308 is shown in FIG. 3, one or more of the elements, processes, and/or devices illustrated in FIG. 3 and/or FIG. 4 may be combined, divided, re-arranged, omitted, eliminated, and/or implemented in any other way. Further, the example variant manager 402, the example cost model learner 404, the example weight storage 406, the example compilation auto-scheduler 408, the example variant compiler 410, the example jump table 412, the example application compiler 414, the example feedback interface 416, the example performance analyzer 418 and/or, more generally, the example variant generator 302 of FIG. 3 and/or the example variant library 310, the example jump table library 312, the example runtime scheduler 314 and/or, more generally, the example executable 308 of FIG. 3 may be implemented by hardware, software, firmware and/or any combination of hardware, software and/or firmware. Thus, for example, any of the example variant manager 402, the example cost model learner 404, the example weight storage 406, the example compilation auto-scheduler 408, the example variant compiler 410, the example jump table 412, the example application compiler 414, the example feedback interface 416, the example performance analyzer 418 and/or, more generally, the example variant generator 302 and/or the example variant library 310, the example jump table library 312, the example runtime scheduler 314 and/or, more generally, the example executable 308 of FIG. 3 could be implemented by one or more analog or digital circuit(s), logic circuits, programmable processor(s), programmable controller(s), GPU(s), DSP(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example variant manager 402, the example cost model learner 404, the example weight storage 406, the example compilation auto-scheduler 408, the example variant compiler 410, the example jump table 412, the example application compiler 414, the example feedback interface 416, the example performance analyzer 418 and/or, more generally, the example variant generator 302 and/or the example variant library 310, the example jump table library 312, the example runtime scheduler 314 and/or, more generally, the example executable 308 of FIG. 3 is/are hereby expressly defined to include a non-transitory computer readable storage device or storage disk such as a memory, a digital versatile disk (DVD), a compact disk (CD), a Blu-ray disk, etc., including the software and/or firmware. Further still, the example variant generator 302 of FIG. 3 and/or the example executable 308 may include one or more elements, processes and/or devices in addition to, or instead of, those illustrated in FIG. 3 and/or FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
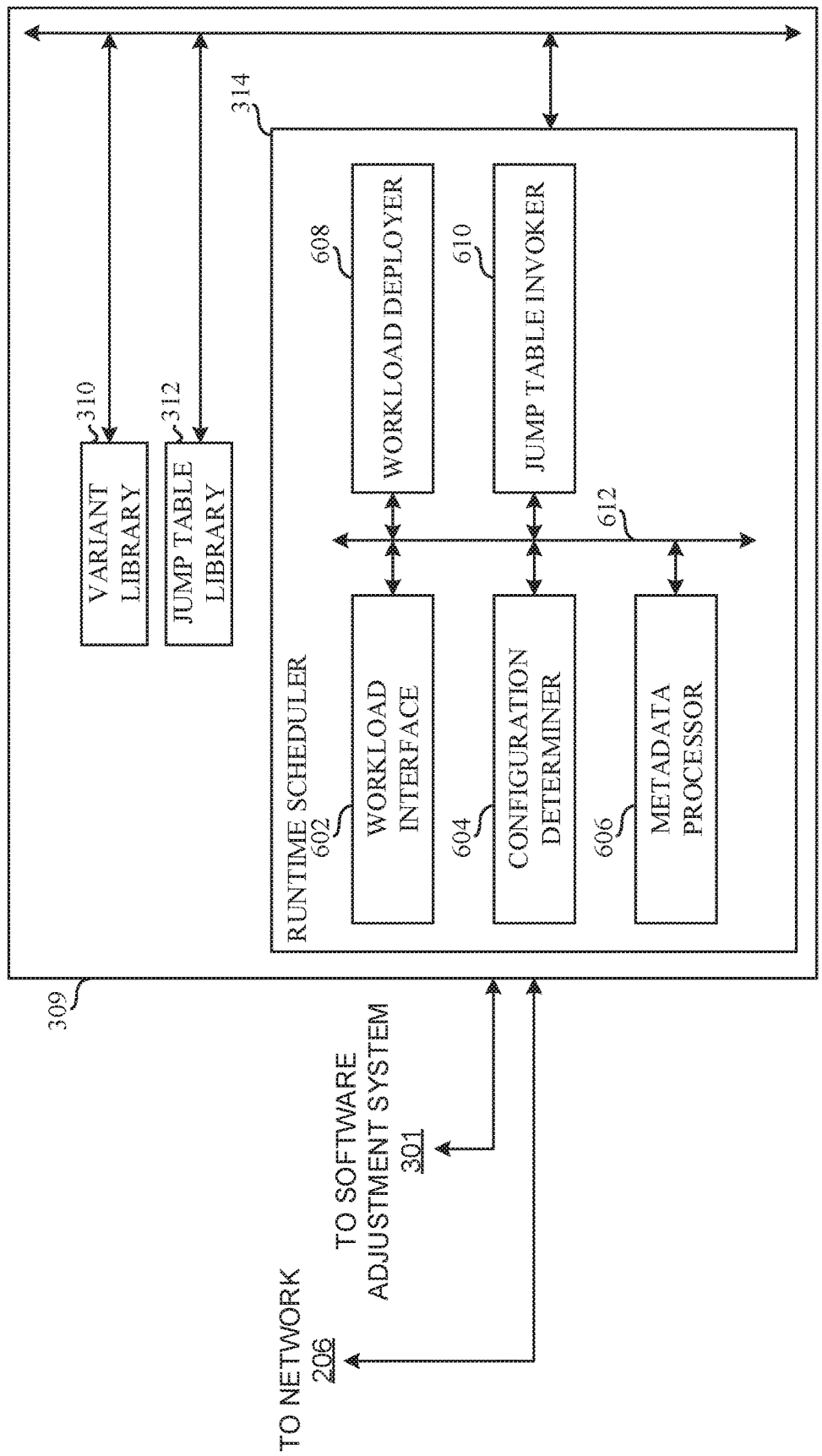
FIG. 6 depicts a block diagram illustrating an example implementation of the runtime scheduler of FIGS. 3 and/or 5.

FIG. 6 depicts a block diagram illustrating an example implementation of the runtime scheduler 314 of FIG. 3. The runtime scheduler 314 determines an implementation of an execution of a workload on the heterogeneous system 304 of FIG. 3. For example, the runtime scheduler 314 can determine a portion or an entirety of a workload to be executed by a processing element of the heterogeneous system 304 based on a configuration of the heterogeneous system 304. In such examples, the runtime scheduler 314 can determine to offload a workload from the CPU 316 of FIG. 3 to the VPU 320 of FIG. 3 in response to determining and/or otherwise based on the configuration of the heterogeneous system 304 including the CPU 316 and the VPU 320. The runtime scheduler 314 of the illustrated example includes an example workload interface 620, an example configuration determiner 604, an example metadata processor 606, an example workload deployer 608, an example jump table invoker 610, and an example interface bus 612.

In the illustrated example of FIG. 6, the runtime scheduler 314 includes the workload interface 602 to obtain information associated with one or more workloads to be processed by the heterogeneous system 304 of FIG. 3. For example, the workload interface 602 can obtain one or more algorithms to process. In such examples, the workload interface 602 can obtain the one or more algorithms from the fat binary 309 of FIGS. 3 and/or 5, the database 208 of FIG. 2, etc. In some examples, the workload interface 602 obtains the one or more algorithms via the interface bus 612.

In the illustrated example of FIG. 6, the runtime scheduler 314 includes the configuration determiner 604 to determine a configuration (e.g., a target configuration) of the heterogeneous system 304. In some examples, the configuration determiner 604 determines the target configuration to include one or more processing elements. For example, the configuration determiner 604 can determine that the heterogeneous system 304 has a target configuration that includes the CPU 316, the FPGA 318, the VPU 320, the GPU 322, etc., of FIG. 3. In other examples, the configuration determiner 604 can determine that the heterogeneous system 304 has a target configuration including the storage 306 and/or any other type of hardware and/or software component associated with the heterogeneous system 304. In some examples, the configuration determiner 604 can determine the target configuration by generating and/or transmitting one or more pings, queries, messages, etc., to the CPU 316 and/or any other hardware and/or software component of the heterogeneous system 304 via the interface bus 620 to identify and/or otherwise determine an availability or presence of one or more processing elements of interest.

In some examples, the configuration determiner 604 deploys variant binaries corresponding to identified processing elements. For example, the runtime scheduler 314 may be included in the fat binary 309 of FIGS. 3 and/or 5 that includes the variant binaries 502, 504, 506, 508, 510. In such examples, the configuration determiner 604 can determine the target configuration of a heterogeneous system to include a target configuration of the CPU 316, the FPGA 318, and the GPU 322 of FIG. 3. In response to determining that the target configuration does not include the VPU 320 of FIG. 3, the configuration determiner 604 can cull, disable, or remove at least the fourth variant binary 508. Accordingly, the configuration determiner 604 can deploy the fat binary 309 without excess code portions or code portions that may never be executed due to the corresponding hardware not being present and/or otherwise not available to execute a workload.

In the illustrated example of FIG. 6, the runtime scheduler 314 includes the metadata processor 606 to determine and/or obtain information about a correct or desired usage of a processing element, performance characteristics, and/or workload characteristics associated with the processing element of the heterogeneous system 304. In some examples, the metadata processor 606 determines metadata associated with the correct or the desired usage of the processing element by querying the storage 306 of FIG. 3, by querying the metadata 512 of FIG. 5, etc.

In some examples, the metadata processor 606 determines performance characteristics associated with a first processing element of the heterogeneous system 304 by querying the first processing element or a second processing element in communication with the first processing element. For example, the metadata processor 606 can determine performance characteristics of the CPU 316 (e.g., power consumption of the CPU 316, time to run on the CPU 316, etc.) by querying a performance monitoring unit of the CPU 316, by obtaining a value of one or more hardware or performance counters of the CPU 316, etc. In other examples, the metadata processor 606 can determine performance characteristics associated with the VPU 320 by querying the CPU 316. In such examples, the metadata processor 606 can obtain performance characteristics from the CPU 316 (e.g., via the interface bus 612) based on data obtained by the CPU 316 from the VPU 320.

In some examples, the metadata processor 606 determines workload characteristics associated with a first processing element of the heterogeneous system 304 by querying the first processing element or a second processing element in communication with the first processing element. For example, the metadata processor 606 can determine workload characteristics of the CPU 316 (e.g., a quantity of hardware threads that are idle or in use, a temperature of one or more cores of the CPU 316, etc.) by querying a performance monitoring unit of the CPU 316, by obtaining a value of one or more hardware or performance counters of the CPU 316, by obtaining a value associated with a sensor (e.g., a temperature sensor) monitoring the CPU 316, etc. In other examples, the metadata processor 606 can determine workload characteristics associated with the GPU 322 by querying the CPU 316 and/or the GPU 322. In such examples, the metadata processor 606 can obtain workload characteristics from the CPU 316 (e.g., via the interface bus 612) based on data obtained by the CPU 316 from the GPU 322. In other examples, the metadata processor 606 can obtain workload characteristics from the GPU 322 that are generated by the GPU 322 in response to the GPU 322 executing one or more workloads.

In the illustrated example of FIG. 6, the runtime scheduler 314 includes the workload deployer 608 to determine one or more processing elements of the heterogeneous system 304 to deploy and/or otherwise execute a workload based on metadata (e.g., performance characteristics, workload characteristics, etc.). In some examples, the workload deployer 608 determines a current availability or bandwidth to execute a computing task, etc., of the processing elements of the heterogeneous system 304 of FIG. 3. In such examples, the workload deployer 608 can determine whether one or more of the CPU 316, the FPGA 318, the VPU 320, the GPU 322, etc., of FIG. 3 is available to execute an algorithm based on performance characteristics associated with a corresponding one of the CPU 316, the FPGA 318, the VPU 320, the GPU 322, etc. For example, the workload deployer 608 can load a respective variant onto one or more processing elements of the heterogeneous system 304 by accessing the respective variant symbol from the jump table library 312. In such examples, the workload deployer 608 can load the first variant binary 502 onto the CPU 316 by accessing the variant symbol "_halide_algox_cpu" of the symbols 514 of FIG. 5, load the second variant binary 504 onto the GPU 322 of FIG. 3 by accessing the variant symbol "_halide_algox_gpu" of the symbols 514, etc.

In the illustrated example of FIG. 6, the runtime scheduler 314 includes the jump table invoker 610 to invoke the jump table library 312 of FIG. 3 to execute a workload using the variant library 310 of FIG. 3. In some examples, the workload deployer 608 can identify one or more of the processing elements of the heterogeneous system 304 of FIG. 3 to execute an algorithm. For example, the workload deployer 608 can identify the FPGA 318 of FIG. 3 to execute one or more portions of one or more workloads associated with one or more algorithms. In such examples, based on the performance characteristics of one or more of the processing elements of the heterogeneous system 304 (e.g., the FPGA 318), the workload deployer 608 can invoke the jump table invoker 610 to call and/or otherwise invoke the fifth variant binary 510 of FIG. 5 to execute the one or more portions of the one or more workloads. For example, the jump table invoker 610 can execute and/or otherwise implement the jump function 516 of FIG. 5 to invoke the jump table 412 of FIG. 5 to invoke the fifth variant binary 510 to execute a workload of interest.

In the illustrated example of FIG. 6, the runtime scheduler 314 includes the interface bus 612 to facilitate communication operations associated with the runtime scheduler 314. For example, the interface bus 612 may correspond to an interface circuit or any other type of hardware or logic circuit to facilitate inter-element communication. In some examples, one or more of the workload interface 602, the configuration determiner 604, the metadata processor 606, the workload deployer 608, and/or the jump table invoker 610 are in communication via any suitable wired and/or wireless communication method. In some examples, one or more of the workload interface 602, the configuration determiner 604, the metadata processor 606, the workload deployer 608, and/or the jump table invoker 610 can be in communication with any processing element or hardware component exterior to the runtime scheduler 314 via any suitable wired and/or wireless communication method.

While an example manner of implementing the runtime scheduler 314 of FIG. 3 is illustrated in FIG. 6, one or more of the elements, processes, and/or devices illustrated in FIG. 6 may be combined, divided, re-arranged, omitted, eliminated, and/or implemented in any other way. Further, the example workload interface 602, the configuration determiner 604, the metadata processor 606, the workload deployer 608, the jump table invoker 610, the interface bus 612 and/or, more generally, the example runtime scheduler 314 of FIG. 3 may be implemented by hardware, software, firmware and/or any combination of hardware, software and/or firmware. Thus, for example, any of the example workload interface 602, the configuration determiner 604, the metadata processor 606, the workload deployer 608, the jump table invoker 610, the interface bus 612 and/or, more generally, the example runtime scheduler 314 of FIG. 3 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example workload interface 602, the configuration determiner 604, the metadata processor 606, the workload deployer 608, the jump table invoker 610, the interface bus 612 and/or, more generally, the example runtime scheduler 314 of FIG. 3 is/are hereby expressly defined to include a non-transitory computer readable storage device or storage disk such as a memory, a DVD, a CD, a Blu-ray disk, etc., including the software and/or firmware. Further still, the example runtime scheduler 314 of FIG. 3 may include one or more elements, processes and/or devices in addition to, or instead of, those illustrated in FIG. 6 and/or may include more than one of any or all of the illustrated elements, processes and devices.

Figure 7:
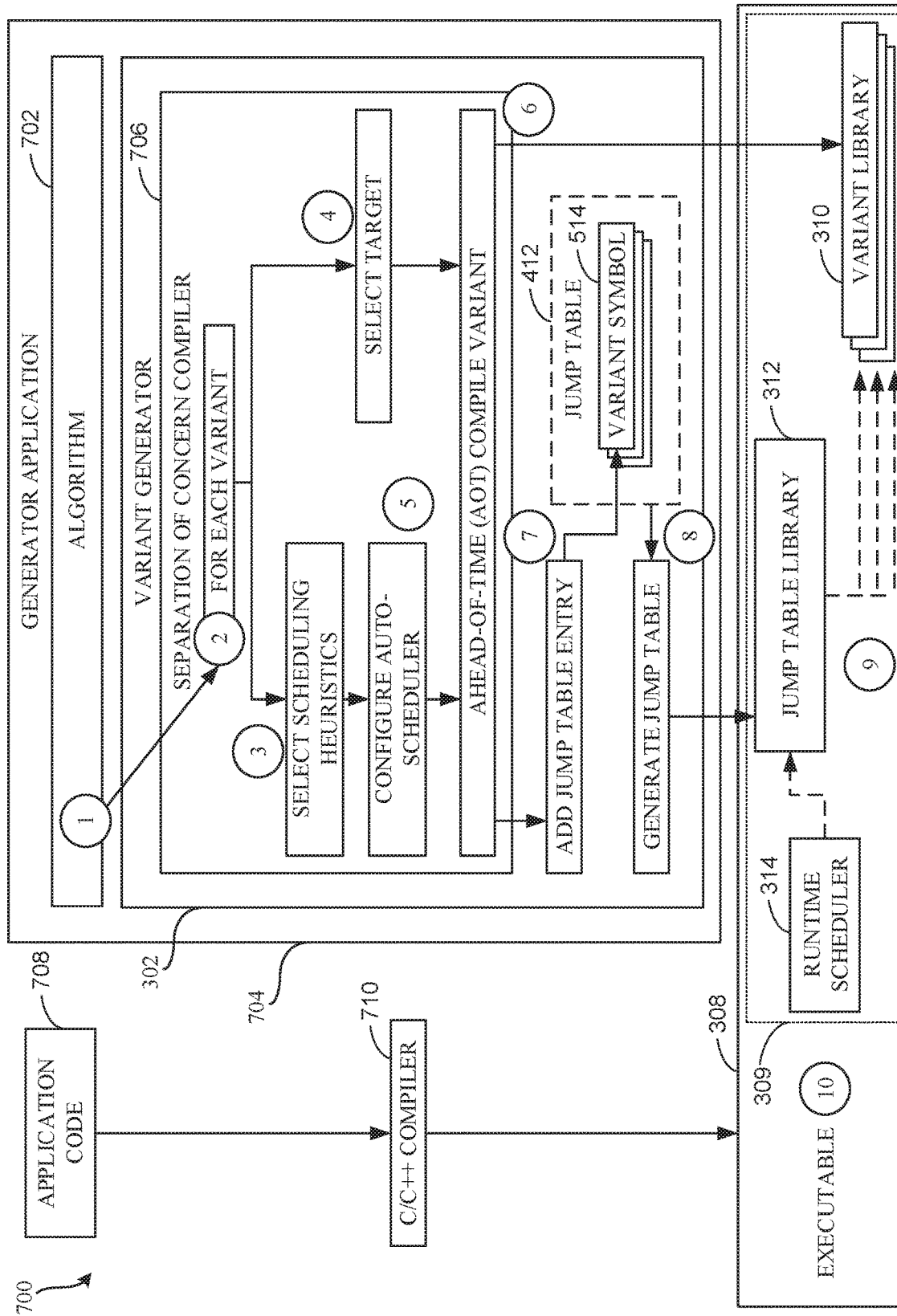
FIG. 7 is an example workflow to compile the example fat binary of FIG. 5.

FIG. 7 is an example workflow 700 to compile the fat binary 309 of FIGS. 3 and/or 5. In the illustrated example of FIG. 7, during a first operation, a user (e.g., an administrator, a developer, etc.) develops, generates, and/or obtains an algorithm 702 using an example generator application 704. For example, the generator application 704 may correspond to an IDE executing on the administrator device 202 of FIG. 2 or a different computing device. For example, the generator application 704 may correspond to an executable that, when executed, can convert, translate, and/or otherwise generate a Halide binary file based on an algorithm.

In the illustrated example of FIG. 7, the generator application 704 includes the variant generator 302 of FIGS. 3 and/or 4 to implement and/or otherwise facilitate execution of a separation of concern compiler 706. In FIG. 7, the variant generator 302 includes the separation of concern compiler 706 to output the variant library 310 of FIG. 3, the jump table library 312 of FIG. 3, etc., for generation of the executable 308. The separation of concern compiler 706 utilizes the principle of separation of concerns to separate how the algorithm 702 is written from how the algorithm 702 is executed. For example, the separation of concern compiler 706 can implement at least one of the variant manager 402, the cost model learner 404, the weight storage 406, the compilation auto-scheduler 408, the variant compiler 410, the jump table 412, the application compiler 414, the feedback interface 416, or the performance analyzer 418 of FIG. 4.

In the illustrated example of FIG. 7, during a second operation, the separation of concern compiler 706 selects a variant (e.g., a variant binary) of interest corresponding to a processing element of interest. For each variant (e.g., to be executed in parallel, in sequential order, etc.), the separation of concern compiler 706 selects scheduling heuristics corresponding to the variant of interest during a third operation and selects a target (e.g., a hardware target, a processing element, etc.) during a fourth operation. In response to selecting the scheduling heuristics at the third operation, the separation of concern compiler 706 configures the compilation auto-scheduler 408 based on the corresponding scheduling heuristics during a fifth operation.

In the illustrated example of FIG. 7, during a sixth operation, the separation of concern compiler 706 ahead-of-time (AOT) compiles a variant binary for each variant of interest. During the sixth operation, the separation of concern compiler 706 stores the compiled variant binary in the variant library 310 of FIG. 3. In FIG. 7, during a seventh operation, the separation of concern compiler 706 invokes the variant generator 302 to add a jump table entry corresponding to the compiled variant binary. For example, a jump table entry of the jump table 412 may be generated and a corresponding one of the variant symbols 514 may be stored at the jump table entry.

In the illustrated example of FIG. 7, during an eighth operation, after each variant has been compiled and/or otherwise processed, the variant generator 302 generates a jump table (e.g., the jump table 412 of FIG. 4) and stores the jump table in the jump table library 312. During a ninth operation, the variant generator 302 generates the fat binary 309 of FIGS. 3 and/or 5 by at least linking the variant library 310, the jump table library 312, and the runtime scheduler 314 of FIGS. 3, 4, and/or 5. During a tenth operation, the variant generator 302 compiles the executable 308 by compiling the fat binary 309. During the tenth operation, the variant generator 302 compiles the executable 308 by compiling example application code 708 into the executable 308. In FIG. 7, the application code 708 is compiled into executable code by an example C/C++ compiler 710. Accordingly, the variant generator 302 can compile the executable 308 by at least linking the variant library 310, the jump table library 312, the runtime scheduler 314, and the compiled version of the application code 708.

Figure 8:
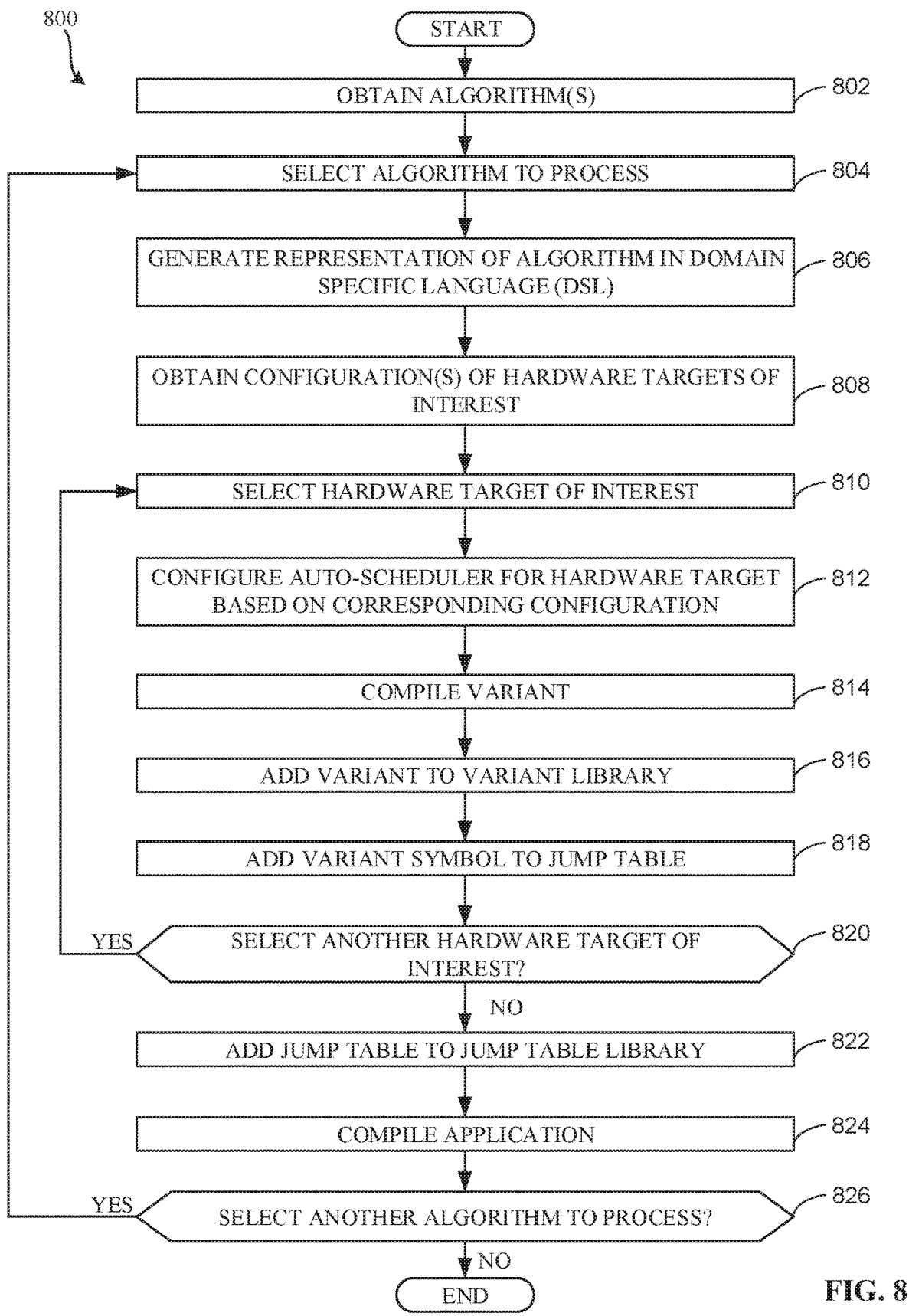
FIG. 8 is a flowchart representative of example machine readable instructions that may be executed to implement the variant generator of FIGS. 3, 4, and/or 7 to compile the example fat binary of FIG. 5.
Figure 10:
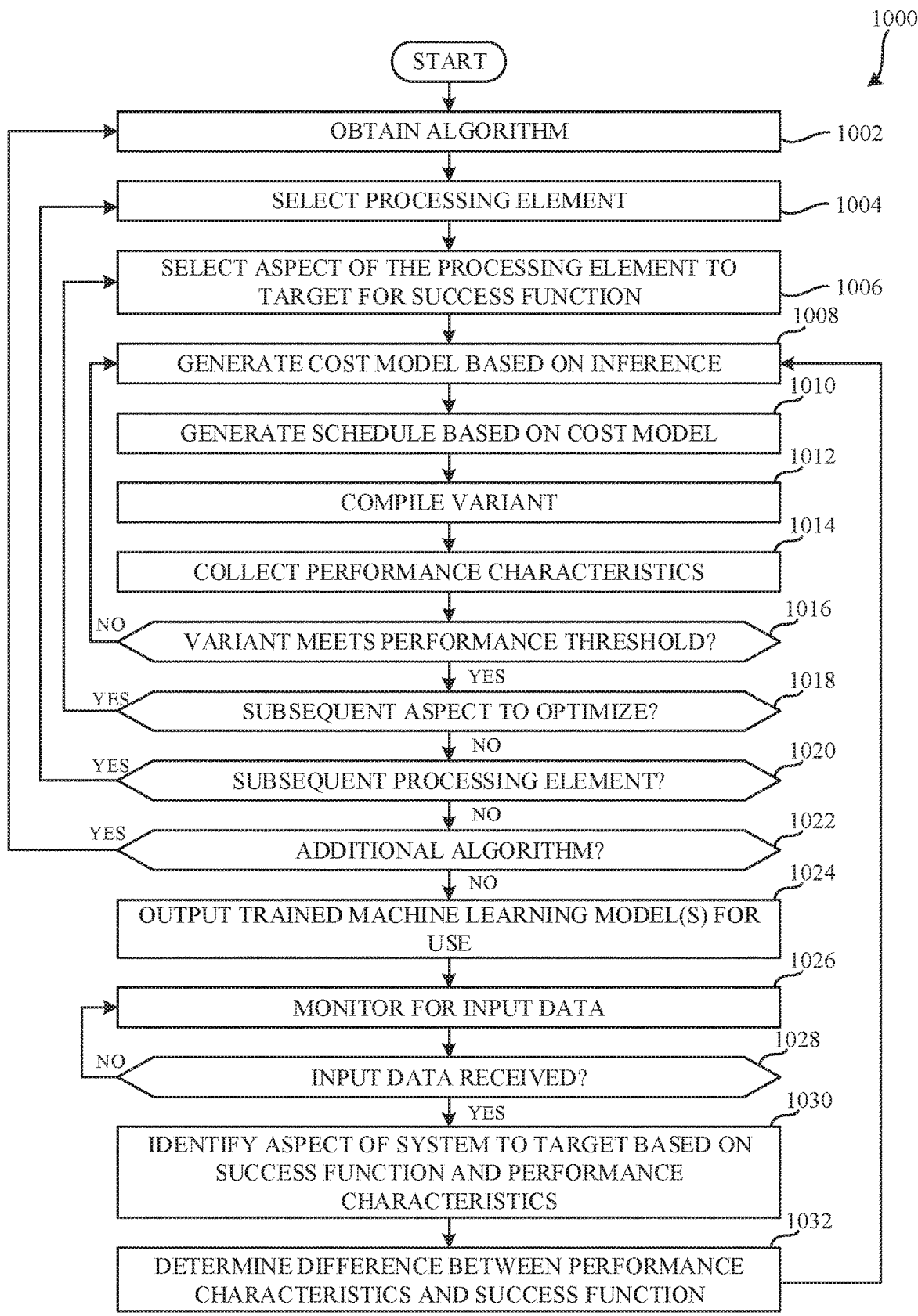
FIG. 10 is a flowchart representative of example machine readable instructions that may be executed to implement the variant generator of FIGS. 3, 4, and/or 7 in a training phase.
Figure 11:
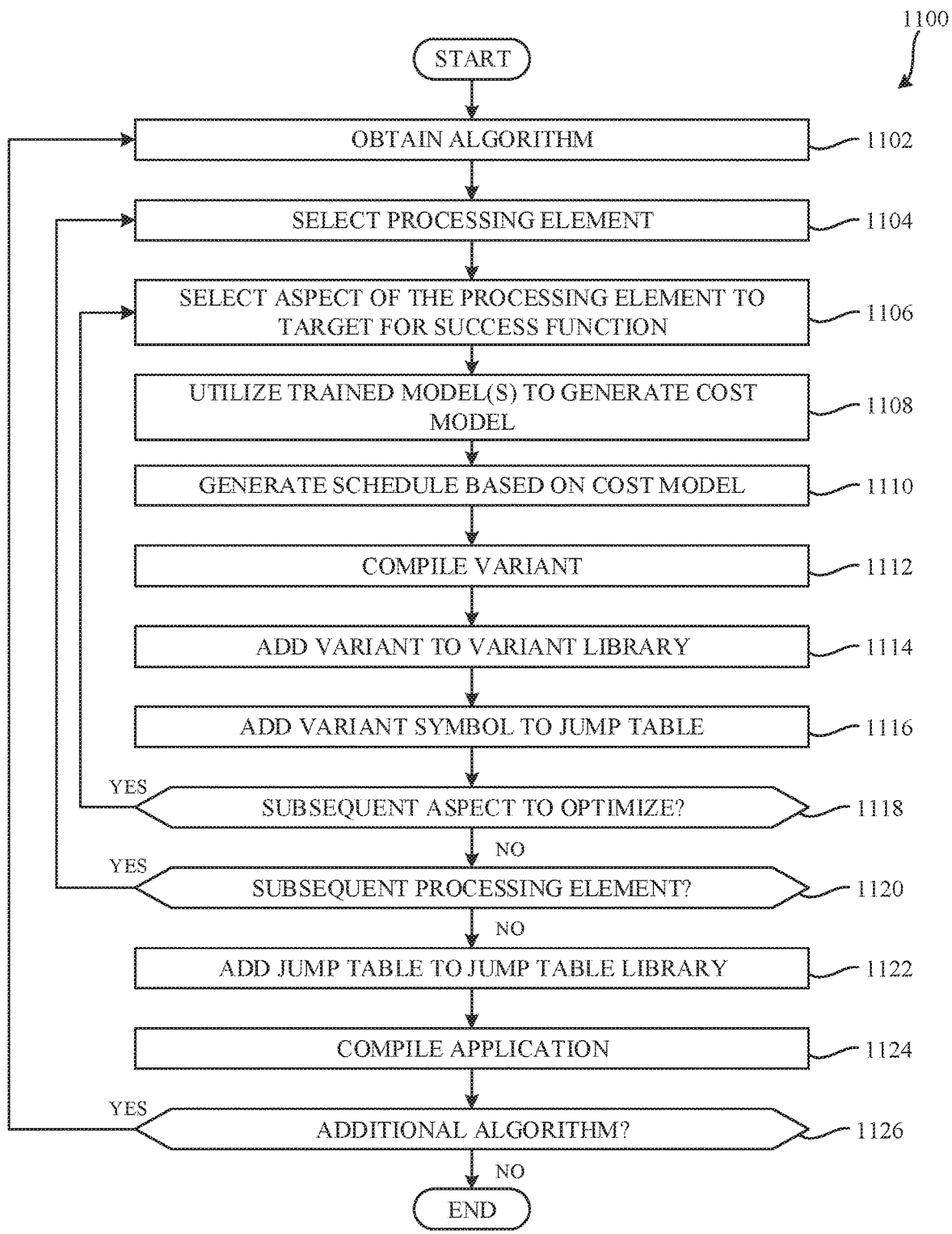
FIG. 11 is a flowchart representative of example machine readable instructions that may be executed to implement the variant generator of FIGS. 3, 4, and/or 7 during an inference phase.

Flowcharts representative of example hardware logic, machine readable instructions, hardware implemented state machines, and/or any combination thereof for implementing the variant generator 302 of FIGS. 3, 4, and/or 7 are shown in FIGS. 8, 10, and 11. The machine readable instructions may be one or more executable programs or portion(s) of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 8, 10, and 11, many other methods of implementing the example variant generator 302 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 9:
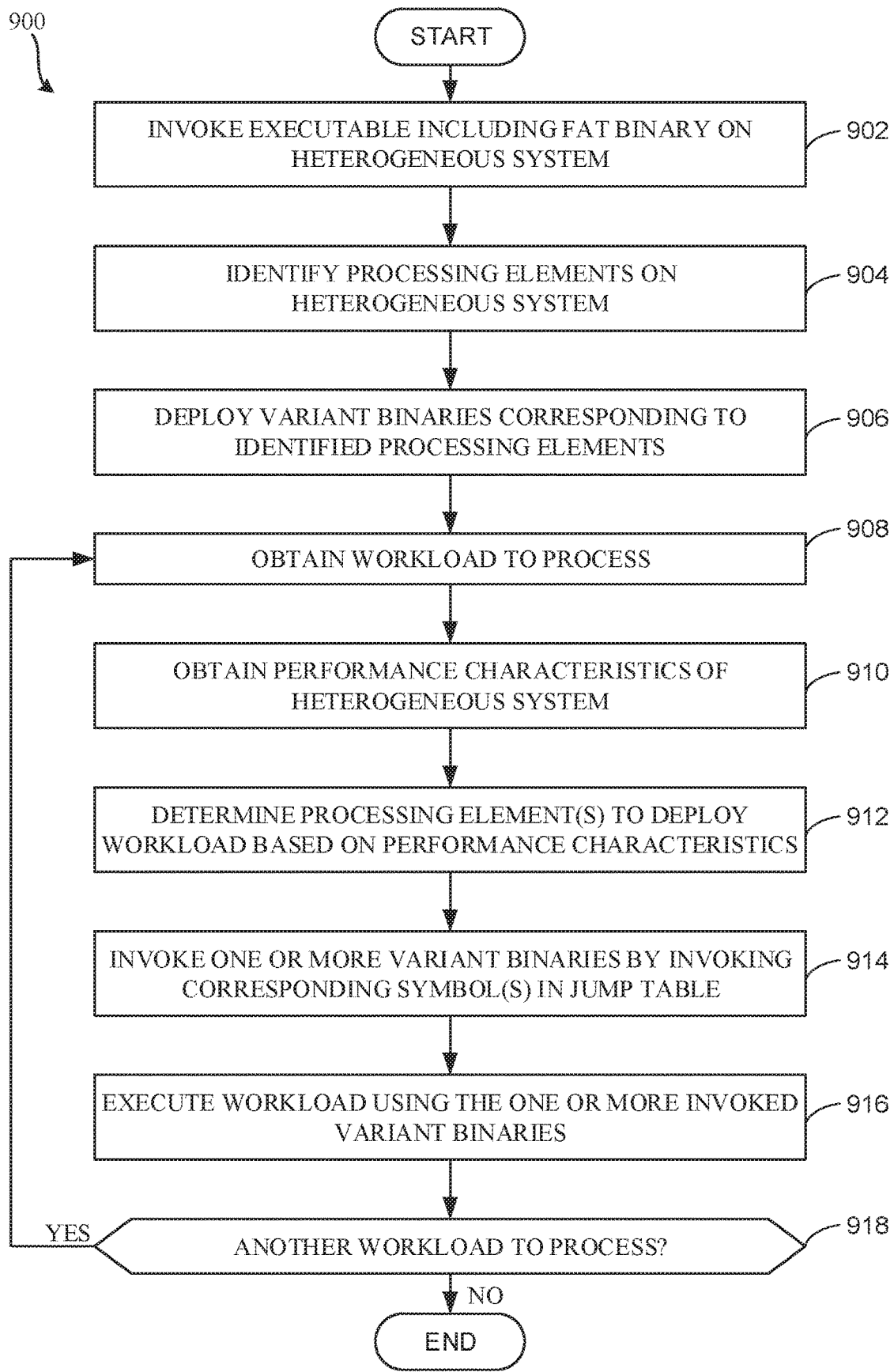
FIG. 9 is a flowchart representative of example machine readable instructions that may be executed to implement the runtime scheduler of FIGS. 3, 5, 6, and/or 7 to facilitate execution of a workload using the example fat binary of FIG. 5.
Figure 12:
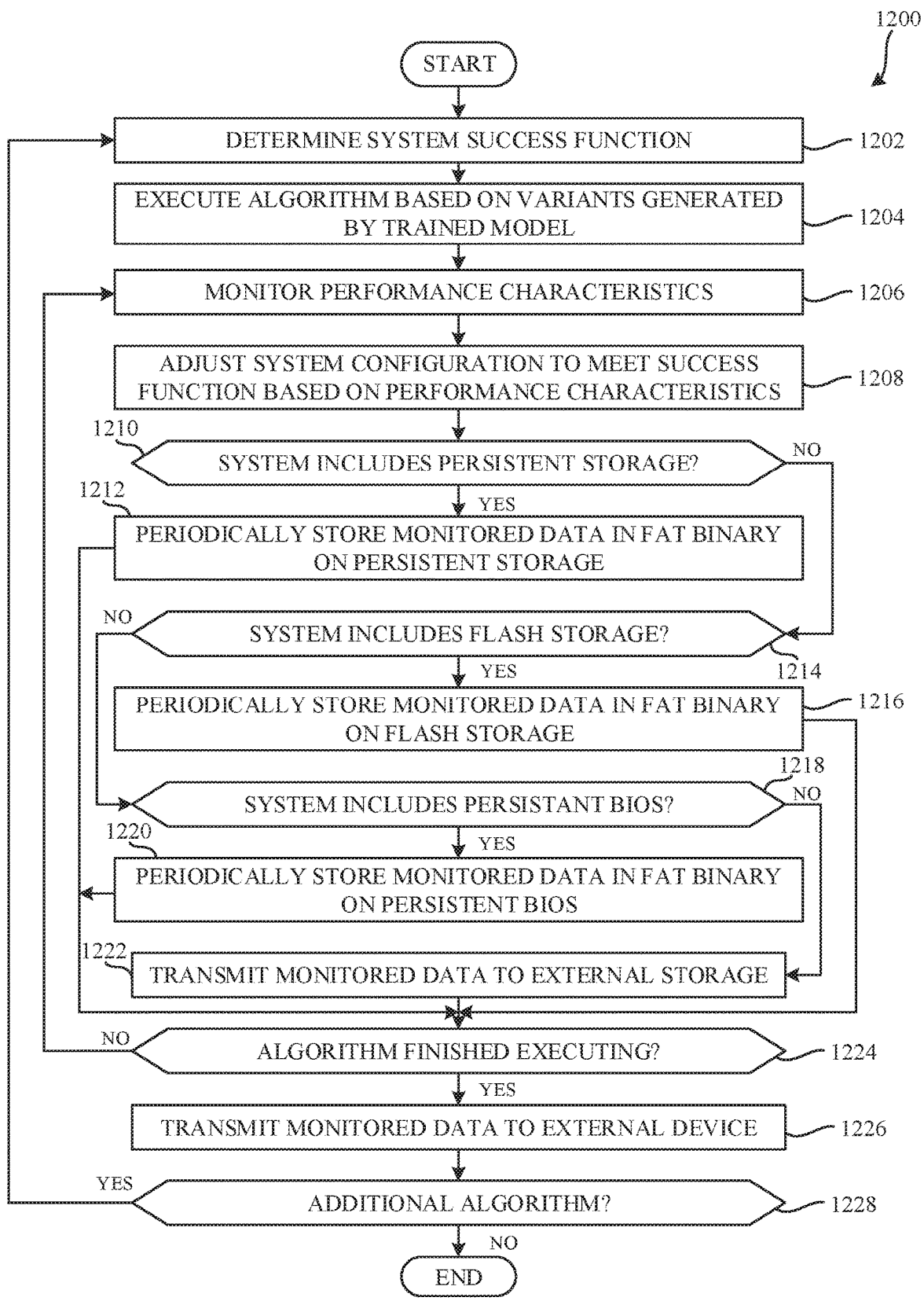
FIG. 12 is a flowchart representative of example machine readable instructions that may be executed to implement the example executable of FIGS. 3 and/or 7 and/or the example fat binary of FIG. 5.

Additionally, flowcharts representative of example hardware logic, machine readable instructions, hardware implemented state machines, and/or any combination thereof for implementing the runtime scheduler 314 of FIGS. 3, 6, and/or 7 and/or, more generally, the executable 308 of FIGS. 3 and/or 7 are shown in FIGS. 9 and 12. The machine readable instructions may be one or more executable programs or portion(s) of an executable program for execution by a computer processor such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 9 and 12, many other methods of implementing the example runtime scheduler 314 and/or, more generally, the executable 308 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), SQL, Swift, etc.

As mentioned above, the example processes of FIGS. 8-12 may be implemented using executable instructions (e.g., computer and/or machine readable instructions) stored on a non-transitory computer and/or machine readable medium such as a HDD, a flash memory, a ROM, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions 800 that may be executed to implement the variant generator 302 of FIG. 3 to compile the fat binary 309 of FIGS. 3 and/or 5. The machine readable instructions 800 of FIG. 8 begin at block 802, at which the variant generator 302 obtains one or more algorithms. For example, the variant manager 402 (FIG. 4) may obtain one or more algorithms of interest to process from the database 208 of FIGS. 2 and/or 3, the heterogeneous system 304 of FIGS. 3 and/or 4. For example, the variant manager 402 may obtain at least a first algorithm and a second algorithm from the database 208 to process.

At block 804, the variant generator 302 selects an algorithm to process. For example, the variant manager 402 may select the first algorithm to process. At block 806, the variant generator 302 generates a representation of the algorithm in a DSL. For example, the variant compiler 410 (FIG. 4) may convert, translate, and/or otherwise generate a Halide representation of the first algorithm. Alternatively, the variant compiler 410 may generate any other type of representation (e.g., separation of concern representation) of the first algorithm.

At block 808, the variant generator 302 obtains configurations of hardware targets of interest. For example, the variant manager 402 may obtain a configuration (e.g., a target configuration) associated with the heterogeneous system 304 of FIG. 3. In such examples, the variant manager 402 can obtain a target configuration from the database 208, the heterogeneous system 304, etc., and/or a combination thereof. The target configuration may include information indicative of the heterogeneous system 304 including the CPU 316, the FPGA 318, the VPU 320, and the GPU 322 of FIG. 3.

At block 810, the variant generator 302 selects a hardware target of interest. For example, the compilation auto-scheduler 408 (FIG. 4) may select the CPU 316 to process. At block 812, the variant generator 302 configures an auto-scheduler for the hardware target based on the corresponding configuration. For example, the compilation auto-scheduler 408 may be configured based on the target configuration associated with the CPU 316. In such examples, the compilation auto-scheduler 408 can be configured based on a hardware architecture, scheduling heuristics, etc., associated with the CPU 316. In response to the configuring, the compilation auto-scheduler 408 can generate a schedule, one or more execution graphs, etc., that can be used by the CPU 316 to execute the workload.

At block 814, the variant generator 302 compiles a variant. For example, the variant compiler 410 may compile the first variant binary 502 of FIG. 5 based on the target configuration associated with the CPU 316, the schedule, the one or more execution graphs, etc., and/or a combination thereof. At block 816, the variant generator 302 adds the variant to a variant library. For example, the variant compiler 410 may add the first variant binary 502 to the variant library 310 of FIG. 3.

At block 818, the variant generator 302 adds a variant symbol to a jump table. For example, the variant compiler 410 may add a variant symbol that corresponds to the first variant binary 502 to the jump table 412 of FIG. 4 of the jump table library 312 of FIGS. 3 and/or 4. In such examples, the variant compiler 410 can add a variant symbol of "_halide_algox_cpu" to correspond to the first variant binary 502 of "ALGOX_CPU.O" as depicted in the illustrated example of FIG. 5.

At block 820, the variant generator 302 determines whether to select another hardware target of interest. For example, the compilation auto-scheduler 408 may select the FPGA 318 of FIG. 3 to process. If, at block 820, the variant generator 302 determines to select another hardware target of interest, control returns to block 810 to select another hardware target of interest. If, at block 820, the variant generator 302 determines not to select another hardware target of interest, then, at block 822, the variant generator 302 adds the jump table to a jump table library. For example, the application compiler 414 (FIG. 4) may add the jump table 412 of FIG. 4 to the jump table library 312 of FIGS. 3 and/or 4.

At block 824, the variant generator 302 compiles an application. For example, the application compiler 414 may compile an application to process one or more algorithms by assembling the executable 308 of FIGS. 3 and/or 7 by linking the runtime scheduler 314, the jump table library 312, and the variant library 310. For example, the application compiler 414 may generate the fat binary 309 of FIGS. 3 and/or 5 based on the one or more linkages.

At block 826, the variant generator 302 determines whether to select another algorithm to process. For example, the variant manager 402 may select the second algorithm to process. If, at block 826, the variant generator 302 determines to select another algorithm to process, control returns to block 804 to select another algorithm to process. If, at block 826, the variant generator 302 determines not to select another algorithm to process, the machine readable instructions 800 of FIG. 8 conclude.

FIG. 9 is a flowchart representative of example machine readable instructions 900 that may be executed to implement the runtime scheduler 314 of FIGS. 3, 5, 6, and/or 7 to facilitate execution of a workload using the fat binary 309 of FIGS. 3 and/or 5. The machine readable instructions 900 of FIG. 9 begin at block 902, at which the runtime scheduler 314 invokes an executable including a fat binary on a heterogeneous system. For example, the workload interface 602 (FIG. 6) may execute the executable 308 of FIGS. 3 and/or 7 stored on the storage 306 of FIG. 3 of the heterogeneous system 304 of FIG. 3 to invoke the fat binary 309. In such examples, the workload interface 602 can execute the executable 308 in response to obtaining an algorithm, a workload, etc., and/or a combination thereof.

At block 904, the runtime scheduler 314 identifies processing elements on the heterogeneous system. For example, the configuration determiner 604 (FIG. 6) may determine that the heterogeneous system 304 of FIG. 3 includes at least one of the CPU 316, the FPGA 318, the VPU 320, or the GPU 322 of FIG. 3.

At block 906, the runtime scheduler 314 deploys variant binaries corresponding to identified processing elements. For example, the configuration determiner 604 may determine that the heterogeneous system 304 includes the CPU 316, the FPGA 318, the VPU 320, or the GPU 322 of FIG. 3. In response to determining that the heterogeneous system 304 includes the processing elements of FIG. 3, the configuration determiner 604 can deploy the first through the fifth variant binaries 502, 504, 506, 508, 510. For example, the configuration determiner 604 may not remove any of the first through fifth variant binaries 502, 504, 506, 508, 510 because each of the first through fifth variant binaries 502, 504, 506, 508, 510 corresponds to an available processing element of the heterogeneous system 304.

At block 908, the runtime scheduler 314 obtains a workload to process. For example, the workload interface 602 obtains an algorithm from the database 208 of FIG. 2, the storage 306 of FIG. 3, etc., to process.

At block 910, the runtime scheduler 314 obtains performance characteristics of the heterogeneous system. For example, the metadata processor 606 (FIG. 6) may obtain the metadata 512 of FIG. 5 to obtain performance characteristics associated with the CPU 316, the FPGA 318, the VPU 320, and/or the GPU 322.

At block 912, the runtime scheduler 314 determines processing element(s) to deploy the workload based on the performance characteristics. For example, the workload deployer 608 (FIG. 6) may determine to use the GPU 322 of FIG. 3 to execute the workload based on the performance characteristics corresponding to the GPU 322 being indicative that the GPU 322 has available bandwidth to execute the workload. In other examples, the workload deployer 608 can determine, at a first time, to use the GPU 322 even though the GPU 322 is unavailable to execute the workload at the first time. For example, the workload deployer 608 may determine that the GPU 322 can execute the workload at a second time after the first time. In such examples, the workload deployer 608 can determine that waiting until the second time to execute the workload with the GPU 322 is faster or provides a different benefit (e.g., a different quantity of power consumption, a more efficient use of the processing elements, etc.) than executing the workload with an available one of the processing elements at the first time.

At block 914, the runtime scheduler 314 invokes one or more variant binaries by invoking corresponding symbol(s) in a jump table. For example, the jump table invoker 610 (FIG. 6) may execute the jump function 516 of FIG. 5 to invoke the second variant binary 504 of FIG. 5 of the variant library 310. In such examples, the jump table invoker 610 can invoke the second variant binary 504 by calling and/or otherwise invoking the variant symbol "_halide_algox_gpu" of the variant symbols 514 of the jump table 412.

At block 916, the runtime scheduler 314 executes the workload using the one or more invoked variant binaries. For example, the workload deployer 608 may execute the application function 518 of FIG. 5 to execute the workload using the second variant binary 504. For example, the workload deployer 608 can load the second variant binary 504 onto the GPU 322 by accessing the respective variant symbol from the jump table library 312. In other examples, the workload deployer 608 can execute the application function 518 to execute a first portion of the workload using a first one of the variant binaries 502, 504, 506, 508, 510 and a second portion of the workload using a second one of the variant binaries 502, 504, 506, 508, 510. For example, the workload deployer 608 can load the second variant binary 504 onto the GPU 322 and load the fourth variant binary 508 onto the VPU 320 of FIG. 3 by accessing the respective variant symbol from the jump table library 312.

At block 918, the runtime scheduler 314 determines whether there is another workload to process. For example, the workload interface 602 may determine that there is another workload to process or, in other examples, can determine that there are no additional workloads to process. If, at block 918, the runtime scheduler 314 determines that there is another workload of interest to process, control returns to block 908 to obtain another workload to process, otherwise the machine readable instructions 900 of FIG. 9 conclude.

FIG. 10 is a flowchart representative of example machine readable instructions 1000 that may be executed to implement the variant generator 302 of FIGS. 3, 4, and/or 7 in a training phase. The machine readable instructions 1000 of FIG. 10 begin at block 1002, at which the variant manager 402 obtains an algorithm. For example, the external device may correspond to the administrator device 202 and the algorithm may correspond to an arbitrary algorithm in a set of arbitrary algorithms.

At block 1004, the variant generator 302 selects a processing element for which to develop the algorithm. For example, the variant generator 302 may be developing variants for use on a heterogeneous system including four processing elements. In such examples, the variant manager 402 (FIG. 4) can select one of the processing elements of the heterogeneous system 304 of FIG. 3 for which to generate a variant.

At block 1006, the variant generator 302 selects an aspect of the processing element to target for a success function of the selected processing element. For example, the variant manager 402 may select to target execution speed of the obtained algorithm on the FPGA 318 of FIG. 3.

At block 1008, the variant generator 302 generates a cost model for the selected processing element and the select aspect to target. For example, on an initial run, the cost model learner 404 (FIG. 4) may utilize generic weights for a DNN to generate the cost model. At block 1010, the variant generator 302 generates a schedule to implement the obtained algorithm with a success function associated with the selected aspect on the selected processing element. For example, the compilation auto-scheduler 408 (FIG. 4) may generate a schedule to implement the obtained algorithm with a success function associated with the selected aspect on the selected processing element.

At block 1012, the variant generator 302 compiles a variant. For example, the variant compiler 410 (FIG. 4) may compile the variant according to the schedule generated by the compilation auto-scheduler 408. In such examples, the compiled variant can be loaded into an application that is compiled by the application compiler 414 (FIG. 4) as an executable file (e.g., a binary).

At block 1014, after the variant is subsequently executed on a training system (e.g., a training heterogeneous system), the variant generator 302 collects performance characteristics associated with the performance of the variant on the selected processing element. For example, the feedback interface 416 may obtain the performance characteristics associated with the performance of the variant on the selected processing element.

At block 1016, the variant generator 302 determines whether the execution of the variant meets a performance threshold. For example, the performance analyzer 418 may determine whether the execution of the variant meets and/or otherwise satisfies a performance threshold. If the execution of the variant does not meet the performance threshold (e.g., a desired performance level) (block 1016: NO), control returns to block 1008 where the collected performance characteristics are fed back into the cost model learner 404. If the execution of the variant meets the performance threshold (block 1016: YES), then, at block 1018, the variant generator 302 (e.g., the variant manager 402) determines whether there are any other aspects are to be targeted for success functions for the selected processing element. If there are subsequent aspects to target for success functions (block: 1018: YES), control returns to block 1006. If there are not subsequent aspects to target for success functions (block: 1018: NO), then, at block 1020, the variant generator 302 (e.g., the variant manager 402) determines whether there are any other processing elements for which to develop one or more variants for.

If there are subsequent processing elements (block: 1020: YES), control returns to block 1004. If there are not subsequent processing elements (block: 1020: NO), then, at block 1022, the variant generator 302 (e.g., the variant manager 402) determines whether there are additional algorithms. If there are additional algorithms (block: 1022: YES), control returns to block 1002. If there are not additional algorithms (block: 1022: NO), then, at block 1024, the variant generator 302 (e.g., the variant manager 402) outputs the respective trained DNN models corresponding the respective processing elements of a heterogeneous system (e.g., weight files) for use. For a algorithms to be executed on n processing elements that target m different aspects, the variant generator 302 can generate a*n*m DNN to generate and analyze the various cost models. For example, the variant manager 402 may output the trained DNN models to a database, another variant generator, and/or a heterogeneous system in the field or system.

At block 1026, the variant generator 302 monitors for input data. For example, the feedback interface 416 (FIG. 4) may monitor a database, a heterogeneous system in the field or system, or other data sources that may provide empirically collected performance characteristics.

At block 1028, the variant generator 302 (e.g., the feedback interface 416) determines whether input data has been received and/or otherwise obtained. If the feedback interface 416 determines that input data has not been received (block 1028: NO), control returns to block 1026. If the feedback interface 416 determines that input data has been received (block 1028: YES), then, at block 1030, the variant generator 302 (e.g., the performance analyzer 418) identifies an aspect of the heterogeneous system to target based on the success function of the system and the performance characteristics.

At block 1032, the variant generator 302 (e.g., the performance analyzer 418) determines the difference between the desired performance (e.g., a performance threshold) defined by the success function and the actual performance achieved during execution of the algorithm during the inference phase. In response to determining the difference at block 1032, the machine readable instructions 1000 of FIG. 10 return to block 1008 where the empirical data is re-inserted into the variant generator 302 (e.g., the cost model learner 404) to adjust the cost models of the individual processing element based on the contextual data associated with the system as a whole (e.g., the performance characteristics, such as, runtime load and environment characteristics).

FIG. 11 is a flowchart representative of example machine readable instructions 1100 that may be executed to implement the variant generator 302 of FIGS. 3, 4, and/or 7 during an inference phase. The machine readable instructions 1100 of FIG. 11 begin at block 1102, at which the variant generator 302 (e.g., the variant manager 402) obtains an algorithm from an external device. For example, the external device may correspond to a laptop computer of a program developer, a user, an administrator, etc.

At block 1104, the variant generator 302 (e.g., the variant manager 402) selects a particular processing element for which to develop the algorithm. For example, the variant generator 302 may be developing variants for use on a heterogeneous system including four processing elements. In such examples, the variant manager 402 can select one of the processing elements for which to generate a variant.

At block 1106, the variant generator 302 (e.g., the variant manager 402) selects an aspect of the processing element to target for a success function of the selected processing element. For example, the variant manager 402 may select to target power consumption of execution of the obtained algorithm on an GPU such as the GPU 322 of FIG. 3.

At block 1108, the variant generator 302 (e.g., the cost model learner 404) utilizes the trained DNN models to generate at least one cost model of the algorithm for execution on at least one processing element of a heterogeneous system. At block 1110, the variant generator 302 (e.g., the compilation auto-scheduler 408) generates a schedule to implement the obtained algorithm with a success function associated with the selected aspect on the selected processing element. At block 1112, the variant generator 302 (e.g., the variant compiler 410) compiles a variant according to the schedule generated by the compilation auto-scheduler 408.

At block 1112, the variant generator 302 (e.g., the variant compiler 410) adds the variant to a variant library of the application to be compiled. At block 1116, the variant generator 302 (e.g., the variant compiler 410) adds a variant symbol (e.g., a pointer) to the jump table 412 of FIGS. 4 and/or 5 by transmitting the variant to the jump table 412, which generates a corresponding symbol associated with the location of the variant in a variant library of the application to be compiled.

At block 1118, the variant generator 302 (e.g., the variant manager 402) determines whether there are any other aspects are to be targeted for success functions for the selected processing element. If there are subsequent aspects to target for success functions (block: 1118: YES), control returns to block 1106. If there are not subsequent aspects to target for success functions (block: 1118: NO), then, at block 1120, the variant generator 302 (e.g., the variant manager 402) determines whether there are any other processing elements for which to develop one or more variants for. If there are subsequent processing elements (block: 1120: YES), control returns to block 1104. If there are not subsequent processing elements (block: 1120: NO), then, at block 1122, the variant generator 302 (e.g., the jump table 412) adds the current state of the jump table 412 to the jump table library of the application to be compiled. At block 1124, the variant generator 302 (e.g., the application compiler 414) compiles the different variants for the respective processing elements in the variant library, the variant symbols in the jump table library, and a runtime scheduler into an executable application.

At block 1126, the variant generator (e.g., the variant manager 402) determines whether there are additional algorithms. If there are additional algorithms (block: 1126: YES), control returns to block 1102. If there are not additional algorithms (block: 1126: NO), the machine readable instructions 1100 of FIG. 11 conclude.

FIG. 12 is a flowchart representative of example machine readable instructions 1200 that may be executed to implement the executable 308 of FIGS. 3 and/or 7. The machine readable instructions 1200 begin at block 1202, at which the runtime scheduler 314 (FIG. 3) determines a system-wide success function for a heterogeneous system.

At block 1204, the runtime scheduler 314 executes the algorithm on a heterogeneous system according to variants generated by a trained ML/AI model. At block 1206, the runtime scheduler 314 monitors the performance characteristics of the heterogeneous system under a load and environmental conditions.

At block 1208, the runtime scheduler 314 adjusts the configuration of the heterogeneous system to meet the system-wide success function. For example, based on the performance characteristics, the runtime scheduler 314 may offload the workload executing on the CPU 316 to the GPU 322. To do so, the runtime scheduler 314 can access a variant for the specific algorithm of the workload that corresponds to the GPU 322 that is stored in the variant library 310. The runtime scheduler 314 can load the variant onto the GPU 322 by accessing the respective variant symbol from the jump table library 312.

At block 1210, the runtime scheduler 314 determines whether the heterogeneous system includes persistent storage. If the runtime scheduler 314 determines that the heterogeneous system does include persistent storage (block 1210: YES), then, at block 1212, the runtime scheduler 314 periodically stores the monitored data in the executable (e.g., the fat binary 309 of FIGS. 3 and/or 5) on the persistent storage. After block 1212, control proceeds to block 1224. If the runtime scheduler 314 determines that the heterogeneous system does not include persistent storage (block 1210: NO), then, at block 1214, the runtime scheduler 314 determines whether the heterogeneous system includes flash storage. If the runtime scheduler 314 determines that the heterogeneous system does include flash storage (block 1214: YES), then, at block 1216, the runtime scheduler 314 periodically stores the monitored data in the executable (e.g., the fat binary 309) on the flash storage. After block 1216, control proceeds to block 1224. If the runtime scheduler 314 determines that the heterogeneous system does not include flash storage (block 1214: NO), then, at block 1218, the runtime scheduler 314 determines whether the heterogeneous system includes persistent storage. If the runtime scheduler 314 determines that the heterogeneous system does include persistent BIOS (block 1218: YES), then, at block 1220, the runtime scheduler 314 periodically stores the monitored data in the executable (e.g., the fat binary 309) on the persistent BIOS. After block 1220, control proceeds to block 1224. If the runtime scheduler 314 determines that the heterogeneous system does not include persistent storage (block 1218: NO), then, at block 1222, the runtime scheduler 314 transmits the monitored data (e.g., the empirical performance characteristics) to an external storage (e.g., the database 208 of FIG. 2).

At block 1224, the runtime scheduler 314 determines whether the algorithm has finished executing. If the runtime scheduler 314 determines that the algorithm has not finished executing (block 1224: NO), control returns to block 1206. If the runtime scheduler 314 determines that the algorithm has finished executing (block 1224: YES), then, at block 1226, the runtime scheduler 314 transmits the monitored data (e.g., the empirical performance characteristics) to an external device (e.g., the database 208, the variant generator 302, etc.). At block 1228, the runtime scheduler 314 determines whether there are additional algorithms. If there are additional algorithms (block: 1228: YES), control returns to block 1202. If there are no additional algorithms (block: 1228: NO), the machine readable instructions 1200 of FIG. 12 conclude.

Figure 13:
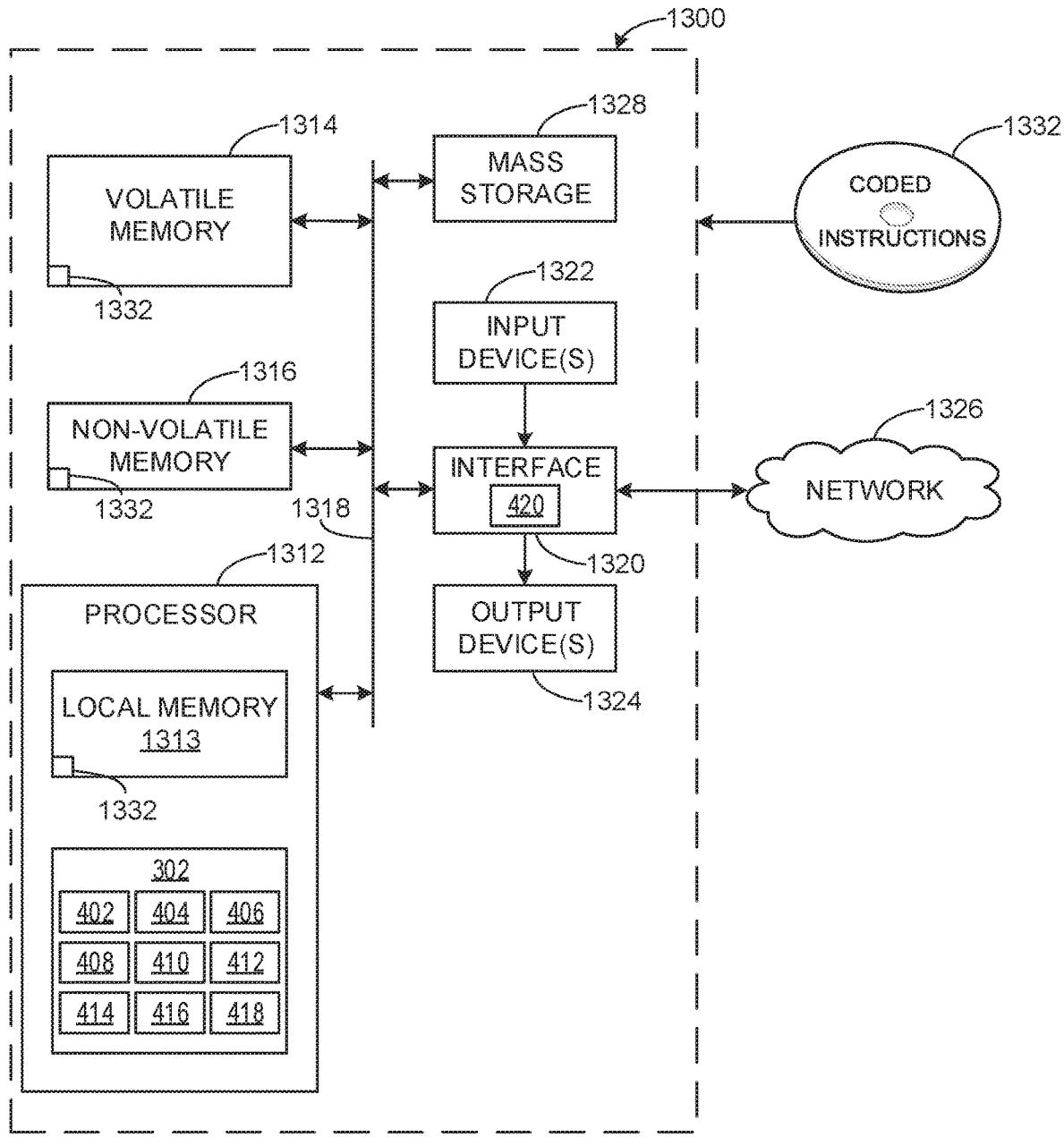
FIG. 13 is a block diagram of an example processing platform structured to execute the example machine readable instructions of FIGS. 8, 10, and/or 11 to implement the variant generator of FIGS. 3, 4, and/or 7.

FIG. 13 is a block diagram of an example processor platform 1300 structured to execute the instructions of FIGS. 8, 10, and/or 11 to implement the variant generator 302 of FIGS. 3, 4, and/or 7. The processor platform 1300 can be, for example, a server, a personal computer, a workstation, a self-learning machine (e.g., a neural network), a mobile device (e.g., a cell phone, a smart phone, a tablet such as an iPad), or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example variant manager 402, the example cost model learner 404, the example weight storage 406, the example compilation auto-scheduler 408, the example variant compiler 410, the example jump table 412, the example application compiler 414, the example feedback interface 416, and the example performance analyzer 418 of FIG. 4.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by SDRAM, DRAM, RDRAM®, and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a USB, a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1320 implements the communication bus 420 of FIG. 4.

The processor platform 1300 of the illustrated example also includes one or more mass storage devices 1328 for storing software and/or data. Examples of such mass storage devices 1328 include floppy disk drives, HDDs, CD drives, Blu-ray disk drives, redundant array of independent disks (RAID) systems, and DVD drives.

The machine executable instructions 1332 of FIGS. 8, 10, and/or 11 may be stored in the mass storage device 1328, in the volatile memory 1314, in the non-volatile memory 1316, and/or on a removable non-transitory computer readable storage medium such as a CD or DVD.

Figure 14:
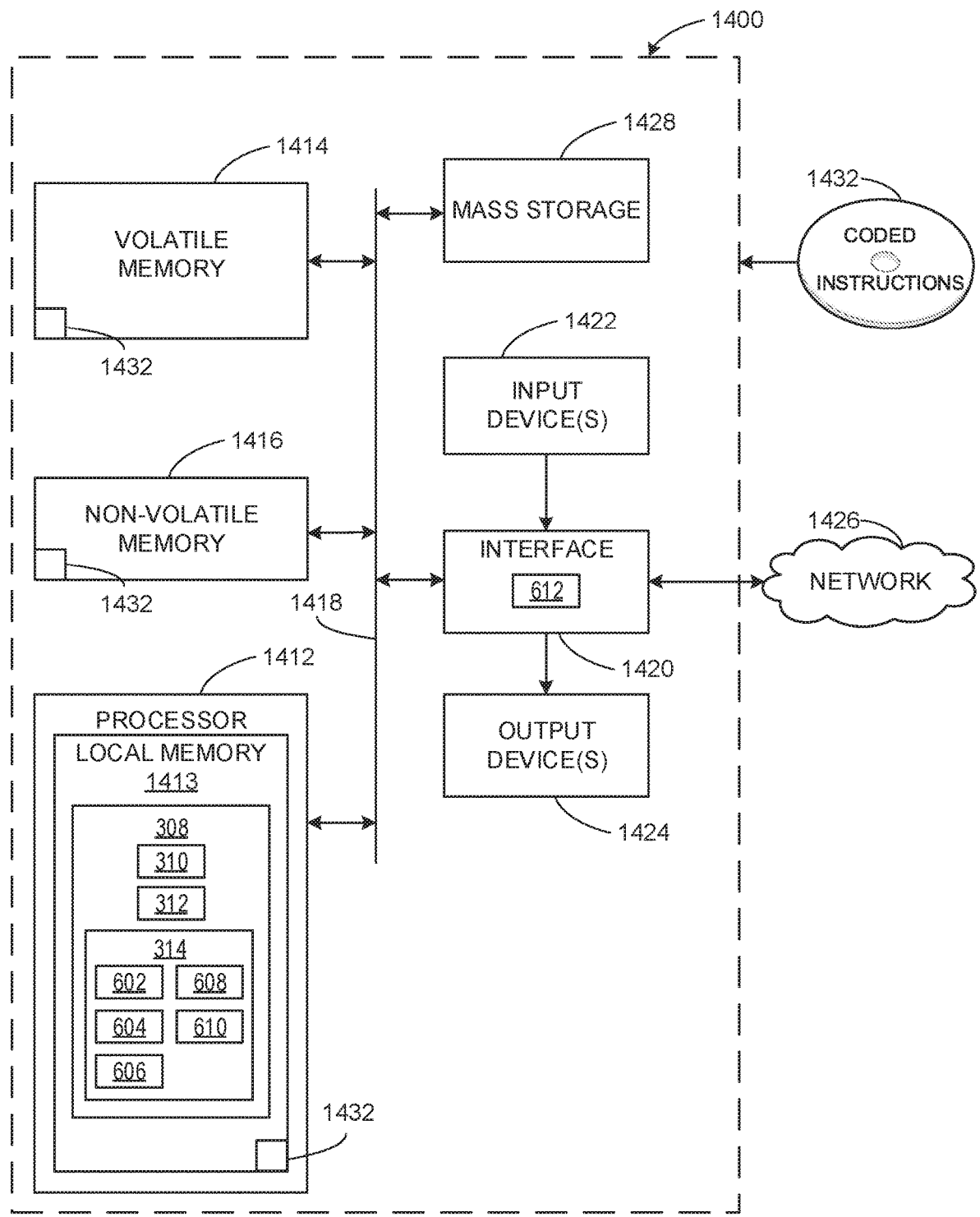
FIG. 14 is a block diagram of an example processing platform structured to execute the example machine readable instructions of FIGS. 9 and/or 12 to implement the runtime scheduler of FIGS. 3, 5, 6, and/or 7 and/or, more generally, the example executable of FIGS. 3 and/or 7.

FIG. 14 is a block diagram of an example processor platform 1400 structured to execute the instructions of FIGS. 9 and/or 12 to implement the runtime scheduler 314 of FIGS. 3, 5, 6, and/or 7 and/or, more generally, the executable 308 of FIGS. 3 and/or 7. The processor platform 1400 can be, for example, a server, a personal computer, a workstation, a self-learning machine (e.g., a neural network), a mobile device (e.g., a cell phone, a smart phone, a tablet such as an iPad™), or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. Additionally, the processor platform 1400 may include additional processing elements such as, the example CPU 316, the example FPGA 318, the example VPU 320, and/or the example GPU 322 of FIG. 3.

The processor 1412 of the illustrated example includes a local memory 1413 (e.g., a cache). In this example, the local memory 1413 and/or, more generally, the processor 1412, includes the example executable 308, the example variant library 310, the example jump table library 312, and the example runtime scheduler 314 of FIG. 3, and the example workload interface 602, the example configuration determiner 604, the example metadata processor 606, the example workload deployer 608, and the example jump table invoker 610 of FIG. 6. The processor 1412 of the illustrated example is in communication with a main memory including a volatile memory 1414 and a non-volatile memory 1416 via a bus 1418. The volatile memory 1414 may be implemented by SDRAM, DRAM, RDRAM®, and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a USB, a Bluetooth® interface, a NFC interface, and/or a PCI express interface. In this example, the interface circuit 1420 implements the interface bus 612 of FIG. 6.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a LED, an OLED, a LCD, a CRT, an IPS display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and DVD drives.

The machine executable instructions 1432 of FIGS. 9 and/or 12 may be stored in the mass storage device 1428, in the volatile memory 1414, in the non-volatile memory 1416, and/or on a removable non-transitory computer readable storage medium such as a CD or DVD.

From the foregoing, it will be appreciated that example methods, apparatus and articles of manufacture have been disclosed that examples disclosed herein do not rely solely on theoretical understanding of processing elements, developer knowledge of algorithm transformations and other scheduling techniques, and the other pitfalls of some methods for compilation scheduling. The examples disclosed herein collect empirical performance characteristics as well as the difference between the desired performance (e.g., a success function) and the actual performance attained. Additionally, the examples disclosed herein allow for the continuous and automated performance improvement of a heterogeneous system without developer intervention. The disclosed methods, apparatus and articles of manufacture improve the efficiency of using a computing device by at least reducing the power consumption of an algorithm executing on a computing device, increasing the speed of execution of an algorithm on a computing device, and increasing the usage of the various processing elements of a computing system. The disclosed methods, apparatus and articles of manufacture are accordingly directed to one or more improvement(s) in the functioning of a computer.

Example methods, apparatus, systems, and articles of manufacture for runtime multi-scheduling of software executing on a heterogeneous system are disclosed herein. Further examples and combinations thereof include the following:

Example 1 includes an apparatus for runtime scheduling of software executing on a heterogeneous system, the apparatus comprising in response to a variant compiler generating a representation of an algorithm in a domain-specific language (DSL), a compilation auto-scheduler to generate a schedule based on configurations for processing elements of the heterogeneous system, the processing elements including at least a first processing element and a second processing element, the variant compiler to compile variant binaries based on the schedule, each of the variant binaries associated with the algorithm in the DSL, the variant binaries including a first variant binary corresponding to the first processing element and a second variant binary corresponding to the second processing element, and an application compiler to generate a fat binary including a runtime scheduler to select one or more of the variant binaries to execute a workload based on the schedule.

Example 2 includes the apparatus of example 1, wherein the configurations include a first configuration corresponding to the first processing element and a second configuration corresponding to the second processing element, the first configuration including at least one of a host architecture of the first processing element, an application programming interface (API) associated with the first processing element, or scheduling heuristics known to improve a performance of the first processing element.

Example 3 includes the apparatus of example 1, wherein the processing elements include at least one of a central processing unit, a field programmable gate array, a graphics processing unit, or a vision processing unit.

Example 4 includes the apparatus of example 1, wherein the variant compiler is to add the first variant binary to a variant library, add a jump table entry to a jump table, the jump table entry including a variant symbol associated with the first processing element, generate a jump table library including the jump table, and generate an application programming interface (API) to invoke the runtime scheduler to access the jump table, and the application compiler is to generate an executable by linking the executable and the fat binary, the executable to invoke the runtime scheduler by invoking the API.

Example 5 includes the apparatus of example 1, further including a feedback interface to obtain a performance characteristic of the heterogeneous system from the fat binary, the performance characteristic associated with one or more of the processing elements executing the workload at a first runtime, the fat binary executing according to a function designating successful execution of the fat binary on the heterogeneous system, and a performance analyzer to determine a performance delta based on the performance characteristic and the function, and prior to a second runtime, adjusting, using a machine learning model, a cost model of the first processing element based on the performance delta.

Example 6 includes the apparatus of example 5, wherein the cost model is a first cost model, and further including a cost model learner, prior to the second runtime, by using a neural network, adjusting a second cost model of the second processing element based on the performance delta.

Example 7 includes the apparatus of example 5, wherein the performance analyzer is to determine the performance delta by determining a difference between performance achieved at the first runtime and performance as defined by the function designating successful execution of the fat binary on the heterogeneous system.

Example 8 includes a non-transitory computer readable storage medium comprising instructions that, when executed, cause a machine to generate a representation of an algorithm in a domain-specific language (DSL), generate a schedule based on configurations for processing elements of a heterogeneous system, the processing elements including at least a first processing element and a second processing element, compile variant binaries based on the schedule, each of the variant binaries associated with the algorithm in the DSL, the variant binaries including a first variant binary corresponding to the first processing element and a second variant binary corresponding to the second processing element, and generate a fat binary including a runtime scheduler to select one or more of the variant binaries to execute a workload based on the schedule.

Example 9 includes the non-transitory computer readable storage medium of example 8, wherein the configurations include a first configuration corresponding to the first processing element and a second configuration corresponding to the second processing element, the first configuration including at least one of a host architecture of the first processing element, an application programming interface (API) associated with the first processing element, or scheduling heuristics known to improve a performance of the first processing element.

Example 10 includes the non-transitory computer readable storage medium of example 8, wherein the processing elements include at least one of a central processing unit, a field programmable gate array, a graphics processing unit, or a vision processing unit.

Example 11 includes the non-transitory computer readable storage medium of example 8, wherein the instructions, when executed, cause the machine to add the first variant binary to a variant library, add a jump table entry to a jump table, the jump table entry including a variant symbol associated with the first processing element, generate a jump table library including the jump table, generate an application programming interface (API) to invoke the runtime scheduler to access the jump table, and generate an executable by linking the executable and the fat binary, the executable to invoke the runtime scheduler by invoking the API.

Example 12 includes the non-transitory computer readable storage medium of example 8, wherein the instructions, when executed, cause the machine to obtain a performance characteristic of the heterogeneous system from the fat binary, the performance characteristic associated with one or more of the processing elements executing the workload at a first runtime, the fat binary executing according to a function designating successful execution of the fat binary on the heterogeneous system, determine a performance delta based on the performance characteristic and the function, and prior to a second runtime, adjust, using a machine learning model, a cost model of the first processing element based on the performance delta.

Example 13 includes the non-transitory computer readable storage medium of example 12, wherein the cost model is a first cost model, and wherein the instructions, when executed, cause the machine to, prior to the second runtime, using a neural network, adjust a second cost model of the second processing element based on the performance delta.

Example 14 includes the non-transitory computer readable storage medium of example 12, wherein the instructions, when executed, cause the machine to determine the performance delta by determining a difference between performance achieved at the first runtime and performance as defined by the function designating successful execution of the fat binary on the heterogeneous system.

Example 15 includes a method for runtime scheduling of software executing on a heterogeneous system, the method comprising generating a representation of an algorithm in a domain-specific language (DSL), generating a schedule based on configurations for processing elements of the heterogeneous system, the processing elements including at least a first processing element and a second processing element, compiling variant binaries based on the schedule, each of the variant binaries associated with the algorithm in the DSL, the variant binaries including a first variant binary corresponding to the first processing element and a second variant binary corresponding to the second processing element, and generating a fat binary including a runtime scheduler to select one or more of the variant binaries to execute a workload based on the schedule.

Example 16 includes the method of example 15, wherein the configurations include a first configuration corresponding to the first processing element and a second configuration corresponding to the second processing element, the first configuration including at least one of a host architecture of the first processing element, an application programming interface (API) associated with the first processing element, or scheduling heuristics known to improve a performance of the first processing element.

Example 17 includes the method of example 15, wherein the processing elements include at least one of a central processing unit, a field programmable gate array, a graphics processing unit, or a vision processing unit.

Example 18 includes the method of example 15, further including adding the first variant binary to a variant library, adding a jump table entry to a jump table, the jump table entry including a variant symbol associated with the first processing element, generating a jump table library including the jump table, generating an application programming interface (API) to invoke the runtime scheduler to access the jump table, and generating an executable by linking the executable and the fat binary, the executable to invoke the runtime scheduler by invoking the API.

Example 19 includes the method of example 15, further including obtaining a performance characteristic of the heterogeneous system from the fat binary, the performance characteristic associated with one or more of the processing elements executing the workload at a first runtime, the fat binary executing according to a function designating successful execution of the fat binary on the heterogeneous system, determining a performance delta based on the performance characteristic and the function, and prior to a second runtime, adjusting, using a machine learning model, a cost model of the first processing element based on the performance delta.

Example 20 includes the method of example 19, wherein the cost model is a first cost model, and further including prior to the second runtime, using a neural network, adjusting a second cost model of the second processing element based on the performance delta.

Example 21 includes the method of example 19, wherein determining the performance delta includes determining a difference between performance achieved at the first runtime and performance as defined by the function designating successful execution of the fat binary on the heterogeneous system.

Example 22 includes an apparatus for runtime scheduling of software executing on a heterogeneous system, the apparatus comprising first means for generating a representation of an algorithm in a domain-specific language (DSL), second means for generating a schedule based on configurations for processing elements of the heterogeneous system, the processing elements including at least a first processing element and a second processing element, means for compiling variant binaries based on the schedule, each of the variant binaries associated with the algorithm in the DSL, the variant binaries including a first variant binary corresponding to the first processing element and a second variant binary corresponding to the second processing element, and third means for generating a fat binary including a runtime scheduler to select one or more of the variant binaries to execute a workload based on the schedule.

Example 23 includes the apparatus of example 22, wherein the configurations include a first configuration corresponding to the first processing element and a second configuration corresponding to the second processing element, the first configuration including at least one of a host architecture of the first processing element, an application programming interface (API) associated with the first processing element, or scheduling heuristics known to improve a performance of the first processing element.

Example 24 includes the apparatus of example 22, wherein the processing elements include at least one of a central processing unit, a field programmable gate array, a graphics processing unit, or a vision processing unit.

Example 25 includes the apparatus of example 22, wherein the means for compiling is to add the first variant binary to a variant library, add a jump table entry to a jump table, the jump table entry including a variant symbol associated with the first processing element, generate a jump table library including the jump table, and generate an application programming interface (API) to invoke the runtime scheduler to access the jump table, and the third means for generating is to generate an executable by linking the executable and the fat binary, the executable to invoke the runtime scheduler by invoking the API.

Example 26 includes the apparatus of example 22, further including means for obtaining a performance characteristic of the heterogeneous system from the fat binary, the performance characteristic associated with one or more of the processing elements executing the workload at a first runtime, the fat binary executing according to a function designating successful execution of the fat binary on the heterogeneous system, means for determining a performance delta based on the performance characteristic and the function, and means for adjusting, prior to a second runtime, using a machine learning model, a cost model of the first processing element based on the performance delta.

Example 27 includes the apparatus of example 26, wherein the cost model is a first cost model, the means for adjusting is first means for adjusting, and further including second means for adjusting, prior to the second runtime, by using a neural network, a second cost model of the second processing element based on the performance delta.

Example 28 includes the apparatus of example 26, wherein the means for determining is to determine the performance delta by determining a difference between performance achieved at the first runtime and performance as defined by the function designating successful execution of the fat binary on the heterogeneous system.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus for runtime scheduling of software executing on a heterogeneous system, the apparatus comprising:
a compilation auto-scheduler to generate a schedule based on configurations for processing elements of the heterogeneous system, the compilation autoscheduler to generate the schedule in response to a variant compiler generating a representation of an algorithm in a domain-specific language (DSL), the processing elements including at least a first processing element and a second processing element;
the variant compiler to compile variant binaries based on the schedule, each of the variant binaries associated with the algorithm in the DSL, the variant binaries including a first variant binary corresponding to the first processing element and a second variant binary corresponding to the second processing element;
an application compiler to generate a fat binary including a runtime scheduler to select one or more of the variant binaries to execute a workload based on the schedule; and
at least one logic circuit to implement at least one of the compilation auto-scheduler, the variant compiler, or the application compiler.

2. The apparatus of claim 1, wherein the configurations include a first configuration corresponding to the first processing element and a second configuration corresponding to the second processing element, the first configuration including at least one of a host architecture of the first processing element, an application programming interface (API) associated with the first processing element, or scheduling heuristics known to improve a performance of the first processing element.

3. The apparatus of claim 1, wherein the processing elements include at least one of a central processing unit, a field programmable gate array, a graphics processing unit, or a vision processing unit.

4. The apparatus of claim 1, wherein:
the variant compiler is to:
add the first variant binary to a variant library;
add a jump table entry to a jump table, the jump table entry including a variant symbol associated with the first processing element;
generate a jump table library including the jump table; and
generate an application programming interface (API) to invoke the runtime scheduler to access the jump table; and
the application compiler is to generate an executable by linking the executable and the fat binary, the executable to invoke the runtime scheduler by invoking the API.

5. The apparatus of claim 1, further including:
a feedback interface to obtain a performance characteristic of the heterogeneous system from the fat binary, the performance characteristic associated with one or more of the processing elements executing the workload at a first runtime, the fat binary executing according to a function designating successful execution of the fat binary on the heterogeneous system; and
a performance analyzer to:
determine a performance delta based on the performance characteristic and the function; and
prior to a second runtime, adjusting, using a machine learning model, a cost model of the first processing element based on the performance delta.

6. The apparatus of claim 5, wherein the cost model is a first cost model, and further including a cost model learner to, prior to the second runtime, by using a neural network, adjust a second cost model of the second processing element based on the performance delta.

7. The apparatus of claim 5, wherein the performance analyzer is to determine the performance delta by determining a difference between performance achieved at the first runtime and performance as defined by the function designating successful execution of the fat binary on the heterogeneous system.

8. A non-transitory computer readable storage medium comprising instructions that, when executed, cause a machine to:
generate a representation of an algorithm in a domain-specific language (DSL);
generate a schedule based on configurations for processing elements of a heterogeneous system, the processing elements including at least a first processing element and a second processing element;
compile variant binaries based on the schedule, each of the variant binaries associated with the algorithm in the DSL, the variant binaries including a first variant binary corresponding to the first processing element and a second variant binary corresponding to the second processing element; and
generate a fat binary including a runtime scheduler to select one or more of the variant binaries to execute a workload based on the schedule.

9. The non-transitory computer readable storage medium of claim 8, wherein the configurations include a first configuration corresponding to the first processing element and a second configuration corresponding to the second processing element, the first configuration including at least one of a host architecture of the first processing element, an application programming interface (API) associated with the first processing element, or scheduling heuristics known to improve a performance of the first processing element.

10. The non-transitory computer readable storage medium of claim 8, wherein the processing elements include at least one of a central processing unit, a field programmable gate array, a graphics processing unit, or a vision processing unit.

11. The non-transitory computer readable storage medium of claim 8, wherein the instructions, when executed, cause the machine to:
add the first variant binary to a variant library;
add a jump table entry to a jump table, the jump table entry including a variant symbol associated with the first processing element;
generate a jump table library including the jump table;
generate an application programming interface (API) to invoke the runtime scheduler to access the jump table; and
generate an executable by linking the executable and the fat binary, the executable to invoke the runtime scheduler by invoking the API.

12. The non-transitory computer readable storage medium of claim 8, wherein the instructions, when executed, cause the machine to:
obtain a performance characteristic of the heterogeneous system from the fat binary, the performance characteristic associated with one or more of the processing elements executing the workload at a first runtime, the fat binary executing according to a function designating successful execution of the fat binary on the heterogeneous system;
determine a performance delta based on the performance characteristic and the function; and
prior to a second runtime, adjust, using a machine learning model, a cost model of the first processing element based on the performance delta.

13. The non-transitory computer readable storage medium of claim 12, wherein the cost model is a first cost model, and wherein the instructions, when executed, cause the machine to, prior to the second runtime, using a neural network, adjust a second cost model of the second processing element based on the performance delta.

14. The non-transitory computer readable storage medium of claim 12, wherein the instructions, when executed, cause the machine to determine the performance delta by determining a difference between performance achieved at the first runtime and performance as defined by the function designating successful execution of the fat binary on the heterogeneous system.

15. A method for runtime scheduling of software executing on a heterogeneous system, the method comprising:
generating a representation of an algorithm in a domain-specific language (DSL);
generating a schedule based on configurations for processing elements of the heterogeneous system, the processing elements including at least a first processing element and a second processing element;
compiling variant binaries based on the schedule, each of the variant binaries associated with the algorithm in the DSL, the variant binaries including a first variant binary corresponding to the first processing element and a second variant binary corresponding to the second processing element; and
generating a fat binary including a runtime scheduler to select one or more of the variant binaries to execute a workload based on the schedule.

16. The method of claim 15, wherein the configurations include a first configuration corresponding to the first processing element and a second configuration corresponding to the second processing element, the first configuration including at least one of a host architecture of the first processing element, an application programming interface (API) associated with the first processing element, or scheduling heuristics known to improve a performance of the first processing element.

17. The method of claim 15, wherein the processing elements include at least one of a central processing unit, a field programmable gate array, a graphics processing unit, or a vision processing unit.

18. The method of claim 15, further including:
adding the first variant binary to a variant library;
adding a jump table entry to a jump table, the jump table entry including a variant symbol associated with the first processing element;
generating a jump table library including the jump table;
generating an application programming interface (API) to invoke the runtime scheduler to access the jump table; and
generating an executable by linking the executable and the fat binary, the executable to invoke the runtime scheduler by invoking the API.

19. The method of claim 15, further including:
obtaining a performance characteristic of the heterogeneous system from the fat binary, the performance characteristic associated with one or more of the processing elements executing the workload at a first runtime, the fat binary executing according to a function designating successful execution of the fat binary on the heterogeneous system;
determining a performance delta based on the performance characteristic and the function; and
prior to a second runtime, adjusting, using a machine learning model, a cost model of the first processing element based on the performance delta.

20. The method of claim 19, wherein the cost model is a first cost model, and further including prior to the second runtime, using a neural network, adjusting a second cost model of the second processing element based on the performance delta.

21. The method of claim 19, wherein determining the performance delta includes determining a difference between performance achieved at the first runtime and performance as defined by the function designating successful execution of the fat binary on the heterogeneous system.

22. An apparatus for runtime scheduling of software executing on a heterogeneous system, the apparatus comprising:
first means for generating a representation of an algorithm in a domain-specific language (DSL);
second means for generating a schedule based on configurations for processing elements of the heterogeneous system, the processing elements including at least a first processing element and a second processing element;
means for compiling variant binaries based on the schedule, each of the variant binaries associated with the algorithm in the DSL, the variant binaries including a first variant binary corresponding to the first processing element and a second variant binary corresponding to the second processing element; and
third means for generating a fat binary including a runtime scheduler to select one or more of the variant binaries to execute a workload based on the schedule.

23. The apparatus of claim 22, wherein the configurations include a first configuration corresponding to the first processing element and a second configuration corresponding to the second processing element, the first configuration including at least one of a host architecture of the first processing element, an application programming interface (API) associated with the first processing element, or scheduling heuristics known to improve a performance of the first processing element.

24. The apparatus of claim 22, wherein the processing elements include at least one of a central processing unit, a field programmable gate array, a graphics processing unit, or a vision processing unit.

25. The apparatus of claim 22, wherein:
the means for compiling is to:
add the first variant binary to a variant library;
add a jump table entry to a jump table, the jump table entry including a variant symbol associated with the first processing element;
generate a jump table library including the jump table; and
generate an application programming interface (API) to invoke the runtime scheduler to access the jump table; and
the third means for generating is to generate an executable by linking the executable and the fat binary, the executable to invoke the runtime scheduler by invoking the API.

26. The apparatus of claim 22, further including:
means for obtaining a performance characteristic of the heterogeneous system from the fat binary, the performance characteristic associated with one or more of the processing elements executing the workload at a first runtime, the fat binary executing according to a function designating successful execution of the fat binary on the heterogeneous system;
means for determining a performance delta based on the performance characteristic and the function; and
means for adjusting, prior to a second runtime, using a machine learning model, a cost model of the first processing element based on the performance delta.

27. The apparatus of claim 26, wherein the cost model is a first cost model, the means for adjusting is first means for adjusting, and further including second means for adjusting, prior to the second runtime, by using a neural network, a second cost model of the second processing element based on the performance delta.

28. The apparatus of claim 26, wherein the means for determining is to determine the performance delta by determining a difference between performance achieved at the first runtime and performance as defined by the function designating successful execution of the fat binary on the heterogeneous system.

* * * * *